(12) United States Patent
Nakamura et al.

(10) Patent No.: US 11,435,968 B2
(45) Date of Patent: Sep. 6, 2022

(54) METHOD FOR INFORMATION PROCESSING APPARATUS, INFORMATION PROCESSING APPARATUS, AND METHOD FOR COMMUNICATION SYSTEM

(71) Applicant: CANON KABUSHIKI KAISHA, Tokyo (JP)

(72) Inventors: Akira Nakamura, Chofu (JP); Yoshinori Yamaguchi, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 17/034,153

(22) Filed: Sep. 28, 2020

(65) Prior Publication Data

US 2021/0096798 A1    Apr. 1, 2021

(30) Foreign Application Priority Data

Sep. 30, 2019  (JP) .............................. JP2019-180719
Mar. 31, 2020  (JP) .............................. JP2020-064198

(51) Int. Cl.
| | | |
|---|---|---|
| *G06F 3/12* | (2006.01) | |
| *H04W 88/08* | (2009.01) | |
| *G06F 21/36* | (2013.01) | |
| *H04N 1/00* | (2006.01) | |

(52) U.S. Cl.
CPC .......... *G06F 3/1292* (2013.01); *G06F 3/1204* (2013.01); *G06F 3/1236* (2013.01); *G06F 3/1238* (2013.01); *G06F 3/1287* (2013.01); *G06F 21/36* (2013.01); *H04W 88/08* (2013.01); *H04N 1/00885* (2013.01)

(58) Field of Classification Search
CPC .... G06F 3/1292; G06F 3/1204; G06F 3/1236; G06F 3/1238; G06F 3/1287; G06F 21/36; G06F 3/1222; G06F 3/1285; G06F 21/44; H04W 88/08; H04N 1/00885
USPC ......................................................... 358/1.15
See application file for complete search history.

(56) References Cited

U.S. PATENT DOCUMENTS

| | | | |
|---|---|---|---|
| 10,708,959 | B2 | 7/2020 | Kawaura |
| 2011/0007901 | A1* | 1/2011 | Ikeda .................. H04L 12/2812 380/270 |
| 2011/0312278 | A1* | 12/2011 | Matsushita ............. H04W 4/80 455/66.1 |
| 2016/0350039 | A1 | 12/2016 | Yamaguchi |
| 2018/0332634 | A1 | 11/2018 | Kawaura |
| 2020/0281032 | A1 | 9/2020 | Kawaura |

FOREIGN PATENT DOCUMENTS

JP    2018191252 A    11/2018

\* cited by examiner

*Primary Examiner* — Darryl V Dottin
(74) *Attorney, Agent, or Firm* — Venable LLP

(57) ABSTRACT

A method for an information processing apparatus, comprising: acquiring first information to be used to establish connection to a connection target access point and second information concerning a communication apparatus to be connected to the access point by imaging a first image displayed on a display unit of another information processing apparatus connected to the access point; establishing wireless connection to the communication apparatus based on the second information acquired in the acquiring the first information; and transmitting the first information to the communication apparatus to cause the communication apparatus to try connection to the access point.

20 Claims, 16 Drawing Sheets

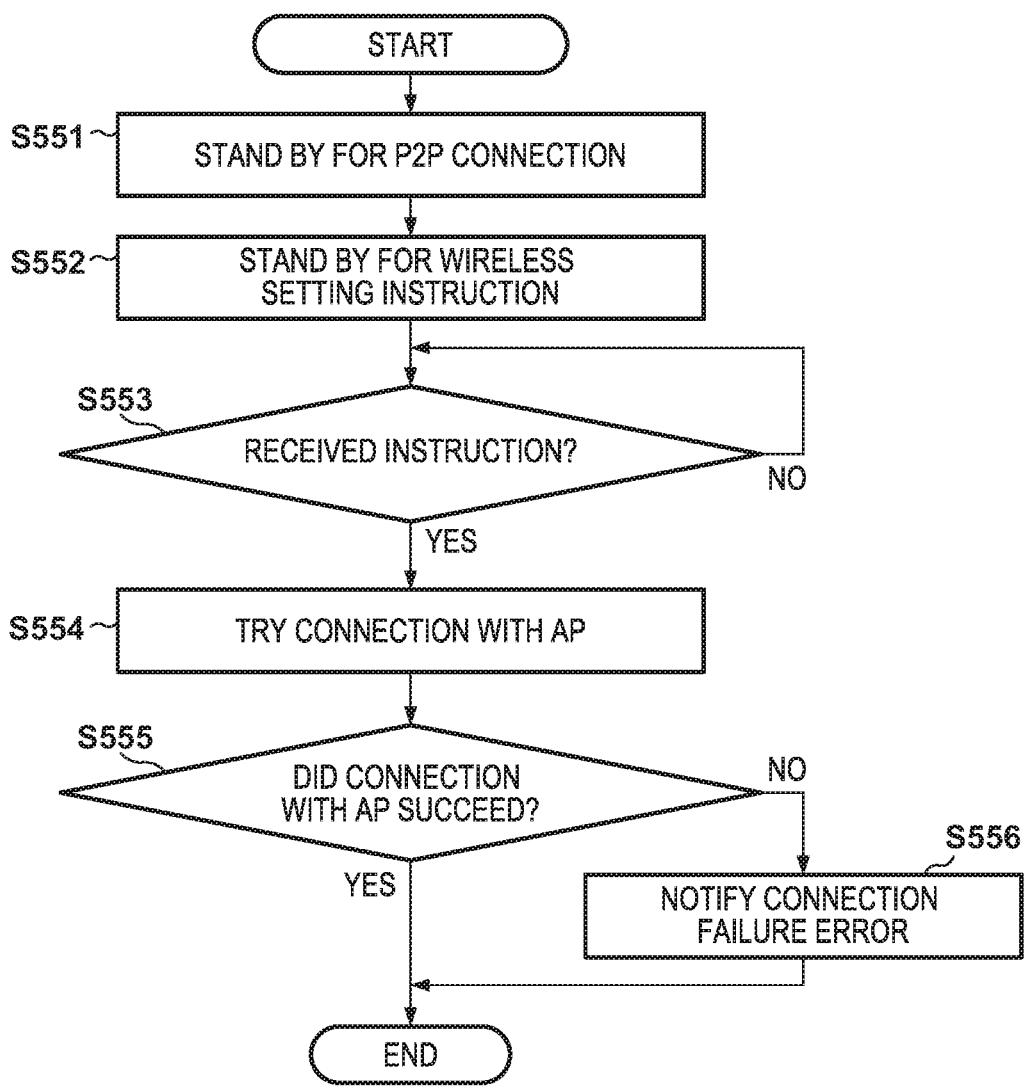

FIG. 7

INPUT ACCESS POINT INFORMATION

PLEASE INPUT INFORMATION OF ACCESS POINT TO WHICH TO CONNECT PRINTER.

SSID: SSID-A ~ 701

PASSWORD: | ABC123 | ~ 702

ENCRYPTION SCHEME: | WEP ▼ | ~ 703

SET WEP SCHEME ~ 704

- WEP KEY LENGTH: | 13 CHARACTERS |
- WEP KEY FORMAT: | CHARACTER STRING ▼ |
- WEP KEY TO USE: | 1 ▼ |

705
| NEXT |

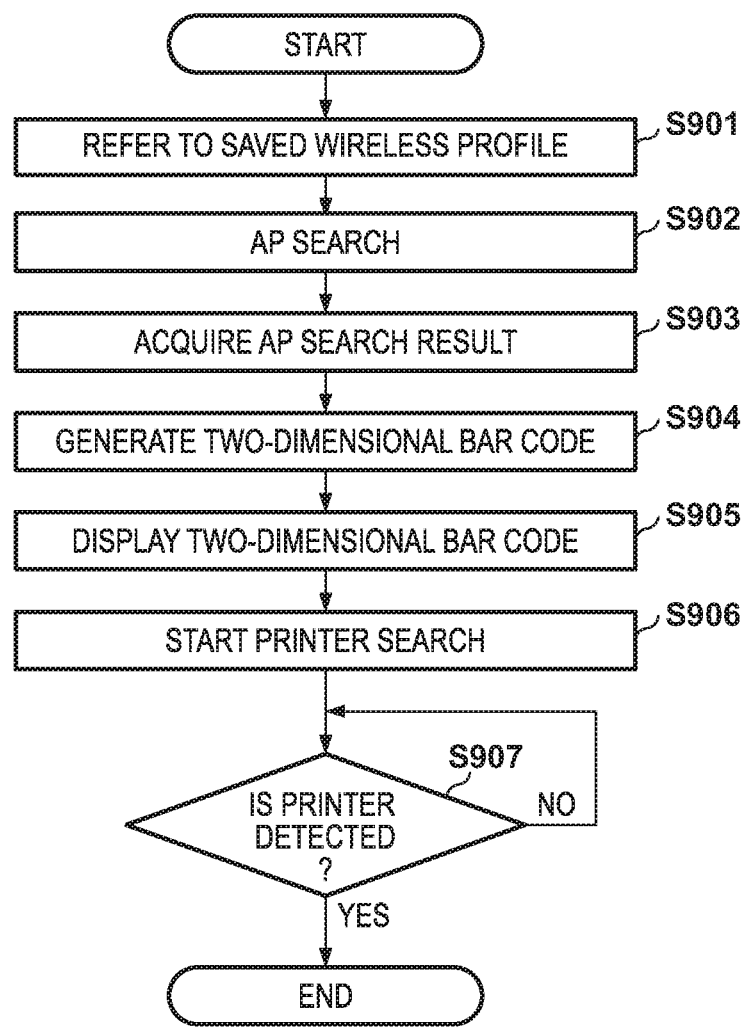

METHOD FOR INFORMATION PROCESSING APPARATUS, INFORMATION PROCESSING APPARATUS, AND METHOD FOR COMMUNICATION SYSTEM

BACKGROUND OF THE INVENTION

Field of the Invention

The present invention relates to a method for an information processing apparatus that wirelessly communicates with a communication apparatus, the information processing apparatus, and a method for a communication system.

Description of the Related Art

In recent years, there are increasing cases in which a plurality of information processing apparatuses having a wireless communication function, such as a smartphone, a PC, and a tablet, are held and used for different application purposes. In addition, many communication apparatuses such as a printer and a digital camera also have a wireless communication function, and are often connected to the same wireless network and used via the wireless network from an information processing apparatus. However, it may be difficult for the user to make setting for connecting the communication apparatus to the wireless network.

Japanese Patent Laid-Open No. 2018-191252 proposes a technique in which in order to make a printer readily join a wireless network, a PC searches for a printer in a wireless setting mode, and performs peer-to-peer connection (to be referred to as P2P connection hereinafter) to the detected printer to transmit a wireless profile saved in the PC to the printer, thereby making wireless setting of the printer.

Some of the information processing apparatuses such as a smartphone impose a restriction for preventing an application from acquiring a result of searching for neighboring access points or part of contents of the wireless profile such as a password saved in the information processing apparatus. If a restriction for preventing an application from acquiring a result of searching for neighboring access points is imposed, the user needs to operate the function of the OS (Operating System) of the information processing apparatus to specify the SSID of the printer in order for the information processing apparatus to perform P2P connection to the printer in the wireless setting mode, as in patent literature 1. If a restriction for preventing an application from acquiring part of contents of the wireless profile is imposed, the user needs to input the password of an access point in order for the information processing apparatus to transmit, to the printer in the wireless setting mode, information necessary to perform connection to the access point. This may make it difficult to make setting, thereby degrading user convenience. Furthermore, to make it possible to use the same printer from a plurality of information processing apparatuses via the wireless network, it is necessary to connect all the information processing apparatuses to the wireless network which an information processing apparatus having performed wireless setting of the printer joins.

SUMMARY OF THE INVENTION

An aspect of the present invention is to eliminate the above-mentioned problem with conventional technology.

A feature of the present invention is to provide a technique of facilitating a setting operation by the user when connecting a communication apparatus to a desired wireless network.

According to a first aspect of the present invention, there is provided a method for an information processing apparatus, comprising: acquiring first information to be used to establish connection to a connection target access point and second information concerning a communication apparatus to be connected to the access point by imaging a first image displayed on a display unit of another information processing apparatus connected to the access point; establishing wireless connection to the communication apparatus based on the second information acquired in the acquiring the first information; and transmitting the first information to the communication apparatus to cause the communication apparatus to try connection to the access point.

According to a second aspect of the present invention, there is provided an information processing apparatus comprising: an acquisition unit configured to acquire first information to be used to establish connection to a connection target access point and second information concerning a communication apparatus to be connected to the access point by imaging a first image displayed on a display unit of another information processing apparatus connected to the access point; a first connection unit configured to establish wireless connection to the communication apparatus based on the second information acquired by the acquisition unit; and a transmission unit configured to transmit the first information to the communication apparatus to cause the communication apparatus to try connection to the access point.

According to a third aspect of the present invention, there is provided a method for a communication system including a communication apparatus and an information processing apparatus, comprising: acquiring, by the information processing apparatus, first information to be used to establish connection to a connection target access point and second information concerning a communication apparatus to be connected to the access point by imaging a first image displayed on a display unit of another information processing apparatus connected to the access point; establishing, by the information processing apparatus, wireless connection to the communication apparatus based on the second information acquired in the acquiring; transmitting, by the information processing apparatus, the first information to the communication apparatus; receiving, by the communication apparatus, the first information from the information processing apparatus; and trying, by the communication apparatus, to establish connection to the access point using the first information received in the receiving.

Further features of the present invention will become apparent from the following description of exemplary embodiments (with reference to the attached drawings).

BRIEF DESCRIPTION OF THE DRAWINGS

FIG. 5B is a flowchart illustrating an example of a process executed in a printer according to the embodiment;

FIG. 7 is a view showing an example of a screen for inputting information of an access point in the smartphone according to the embodiment;

FIG. 9 is a flowchart illustrating an example of a process executed in a PC according to another embodiment;

DESCRIPTION OF THE EMBODIMENTS

Figure 1A:
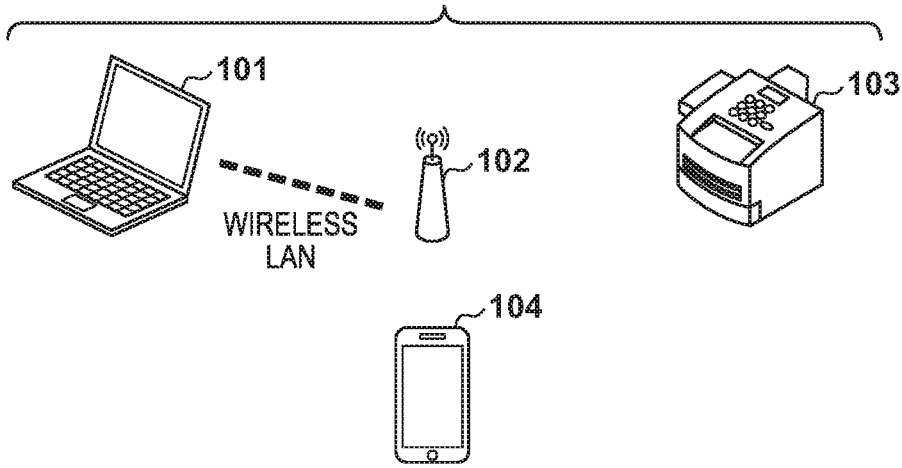
FIGS. 1A to 1C are views for explaining a system configuration according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

A printer, a smartphone, and a PC will be exemplified as a connection target communication apparatus, an information processing apparatus that performs a wireless setting process for the communication apparatus, and another information processing apparatus according to this embodiment, respectively. The present invention, however, is not limited to this, and the information processing apparatus may be a PC, the other information processing apparatus may be a smartphone, and the information processing apparatus and the other information processing apparatus may be apparatuses of the same type. A process of the communication apparatus, the information processing apparatus, or the other information processing apparatus according to this embodiment may be applied to various apparatuses such as a digital camera.

In this embodiment, a PC (first apparatus) connected to an access point (AP) wirelessly connects a smartphone (second apparatus) and a printer to the AP to perform a wireless setting process for performing communication via the AP.

In a conventional method, the user transmits, from the first apparatus connected to the AP to the printer, information concerning the AP to be connected to the printer, wirelessly connects the printer to the AP, and then connects the second apparatus to the AP.

At this time, the first or second apparatus performs P2P connection (direct wireless connection) to the printer to transmit the information concerning the AP to the printer. To perform P2P connection, the first or second apparatus needs to specify the SSID of the connection target printer. To specify the SSID of the printer, the first or second apparatus performs a process (to be referred to as an AP search hereinafter) of searching for the SSIDs of neighboring APs, and selects the SSID of the printer from the list of the acquired SSIDs, thereby deciding a connection destination. Next, the first apparatus automatically specifies the AP connected to itself among the APs connectable to the printer, and transmits information concerning the AP to the printer. Then, the printer is connected to the AP using the information. Examples of the information concerning the AP are the identifier (SSID or the like) of the AP and authentication information (password or the like) to be used in an authentication process of the AP.

In this scenario, for example, an application that performs a connection process of the first apparatus may not be able to acquire the result of the AP search from an OS. In this case, since the PC cannot specify the SSID of the connection destination printer, the user needs to specify the SSID of the printer, and perform an operation for P2P connection between the first apparatus and the printer by, for example, operating the GUI of the OS.

However, if the user is not familiar with the operation of the first apparatus, he/she may not be able to call a target function. Even if the user can call the target function, it may be difficult to specify the SSID of the desired printer when, for example, there are many neighboring APs.

To solve this problem, in this embodiment, information of a printer to be connected and information concerning the connection destination AP of the printer are converted into one two-dimensional code or bar code such as a QR code °, and displayed on the display unit of the first apparatus. Then, the two-dimensional code or bar code is imaged by an application that operates on the other information processing apparatus and can acquire the result of the AP search from the OS. The application on the other information processing apparatus, which has acquired the information from the imaged two-dimensional code or bar code specifies the SSID of the printer, and the other information processing apparatus and the printer perform P2P connection. The other information processing apparatus transmits, to the printer, the information concerning the AP acquired from the two-dimensional code or bar code, and the printer performs connection to the AP using the acquired information. This can reduce the user labor of selecting the SSID by operating the GUI of the OS, and also reduce risk of a failure in connection caused by erroneous selection of the SSID by the user.

Furthermore, to make it possible to use the same printer from a plurality of information processing apparatuses via the wireless network, it is necessary to connect all the information processing apparatuses to the wireless network which the information processing apparatus having performed wireless setting of the printer joins.

Figure 1B:
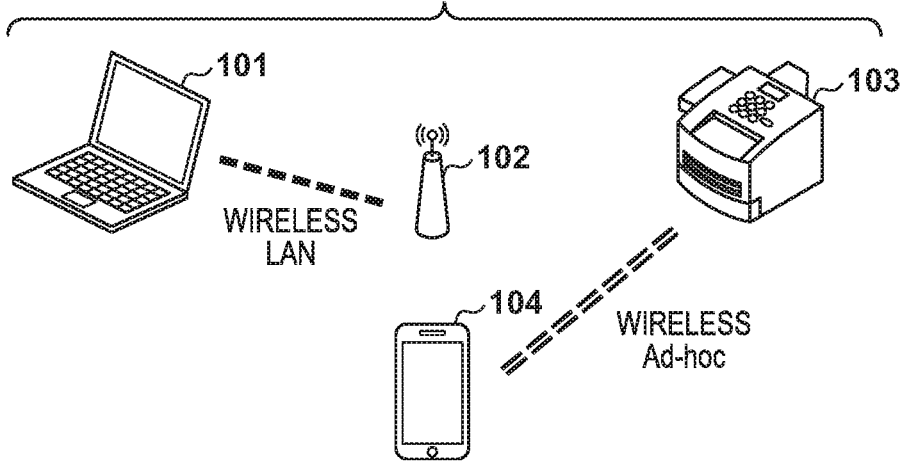
Figure 1C:
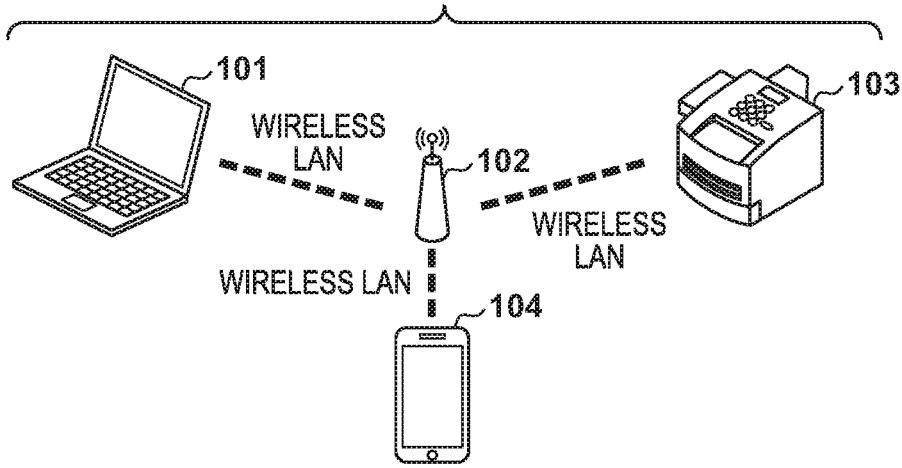

FIGS. 1A to 1C are views for explaining a system configuration according to this embodiment. A system according to this embodiment includes information processing apparatuses such as a PC and a smartphone, a communication apparatus such as a printer, and an AP.

Referring to FIG. 1A, a PC 101 is connected to an access point (AP) 102 by a wireless LAN. Referring to FIG. 1C, a printer 103 and a smartphone 104 are also connected to the AP 102. That is, the PC 101 and the smartphone 104 can communicate with the printer 103 via the AP 102. A method of performing connection via the AP is called infrastructure connection. In infrastructure connection, it is possible to create a network environment in which the PC 101 can communicate with two or more apparatuses.

On the other hand, there is a connection method called P2P connection in which only two apparatuses can communicate with each other. As shown in FIG. 1B, the smartphone 104 and the printer 103 can perform P2P connection by wireless ad hoc connection. However, during wireless ad hoc connection, the smartphone 104 and the printer 103 use wireless LAN interfaces in wireless ad hoc connection, and thus cannot communicate with other apparatuses. Therefore, wireless ad hoc connection is often used as temporary connection.

The smartphone 104 performs a process of connecting the printer 103 to the AP 102 by wireless LAN connection. To do this, the smartphone 104 transmits, to the printer 103, network setting information for connection to the AP 102 using wireless ad hoc connection, thereby connecting the printer 103 to the AP 102.

Note that this embodiment will provide a description by assuming that the PC 101 starts a connection process of connecting the printer 103 to the access point 102 and the smartphone 104 acquires an image displayed on the PC 101 to instruct the printer 103 to perform connection to the AP 102. However, the PC 101 and the smartphone 104 are examples of information processing apparatuses. One smartphone may start a connection process and another smartphone may instruct the printer to perform connection to the AP.

Figure 2:
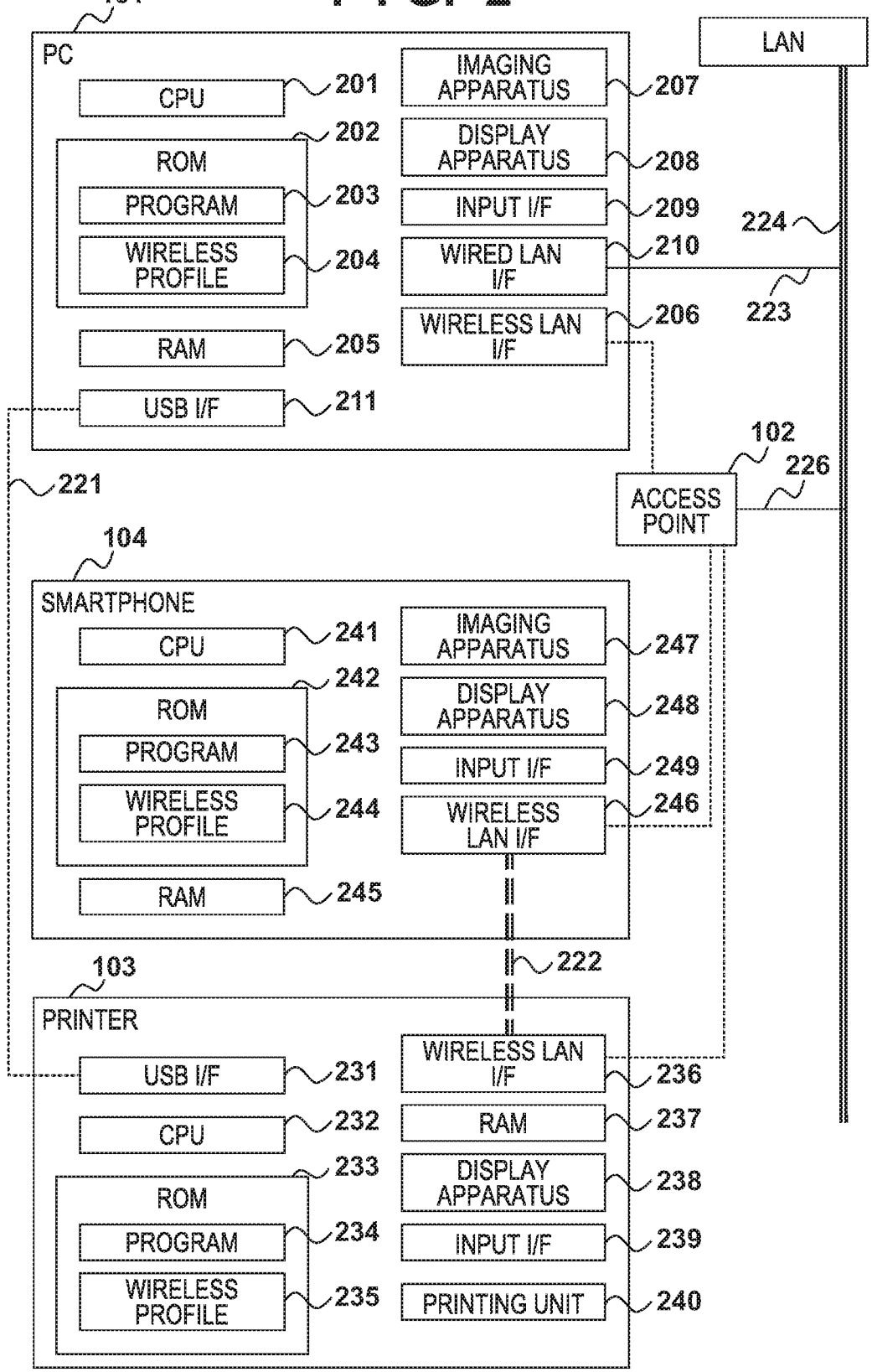
FIG. 2 is a block diagram showing an arrangement including information processing apparatuses and a printer according to the embodiment.

FIG. 2 is a block diagram showing the arrangement of the communication system including the PC 101, the smartphone 104, and the printer 103.

The PC 101 includes a CPU 201, a ROM 202, a RAM 205, an imaging apparatus 207, a display apparatus 208, an input interface (I/F) 209, and a wireless LAN I/F 206. Furthermore, the PC 101 optionally includes a USB (Universal Serial Bus) I/F 211 and a wired LAN I/F 210. Note that the PC 101 need not include the imaging apparatus 207.

The CPU 201 can execute various processes of controlling the operation of the PC 101 including a wireless setting process for instructing the printer to set the wireless network by reading out a program 203 stored in the ROM 202 into the RAM 205 and executing it. The above wireless setting process will be described in detail later.

The ROM 202 stores the program 203 corresponding to the various processes including a program of the above wireless setting process, and a wireless profile 204 (to be described later). When the program (application or the like) of the wireless setting process is installed on the PC 101, unique identification information is also stored in the ROM 202. The unique identification information is uniquely decided for, for example, the manufacturer of the printer or a printer model.

The wireless LAN I/F 206 serves as a communication unit including a wireless transmission/reception circuit, and can perform, in one example, wireless communication complying with IEEE802.11. The imaging apparatus 207 includes one or more image acquisition apparatuses such as cameras arranged in the PC 101. The display apparatus 208 is an apparatus such as a display or a projector for notifying the user of information. The input I/F 209 serves as an input device such as a touch panel display, a keyboard, or a toggle switch. The wired LAN I/F 210 is, for example, a network interface complying with the IEEE802.3 standard. The USB I/F 211 is an interface complying with a standard such as USB 1.0, USB 2.0, USB 3.0, or USB 3.1.

The PC 101 can perform P2P connection to the printer 103 via a USB cable 221 or wireless ad hoc connection. The PC 101 can be connected to a LAN 224 via an Ethernet cable 223. If the printer 103 can also be connected to the LAN 224, the PC 101 and the printer 103 can communicate with each other on the same LAN 224.

Furthermore, when the PC 101 is connected to the AP 102 by a wireless LAN (infrastructure connection) and the AP 102 is connected to the LAN 224 via an Ethernet cable 226, the PC 101 or the smartphone 104 can be connected to the LAN 224.

The PC 101 displays, on the display apparatus 208, a two-dimensional code generated from information of the printer 103 and information of the wireless profile concerning the AP 102. Then, the smartphone 104 images the displayed two-dimensional code by an imaging apparatus 247, and acquires the information from the acquired image of the two-dimensional code.

The wireless profile 204 is information including specifying information (SSID or the like) of the AP 102 connected by the wireless LAN I/F 206 and authentication information (password or the like) used in an authentication process. The wireless profile 204 is stored or managed when the CPU 201 executes an OS (not shown) stored in the ROM 202.

The smartphone 104 includes a CPU 241, a ROM 242, a RAM 245, a wireless LAN I/F 246, an imaging apparatus 247, a display apparatus 248, and an input I/F 249. The components 241 to 249 of the smartphone 104 are the same as the components 201 to 209 of the PC 101, respectively, and a description thereof will be omitted.

Note that the smartphone 104 may optionally include at least one of the wired LAN I/F 210 and the USB I/F 211. In this case, the smartphone 104 may be connected to the printer 103 via the USB cable 221 or the LAN 224.

The printer 103 includes a CPU 232, a ROM 233, a RAM 237, a display apparatus 238, an input I/F 239, a printing unit 240, a USB I/F 231, and a wireless LAN I/F 236. The ROM 233 stores a program 234, a wireless profile 235, and the like. The CPU 232 executes various control operations by the printer 103 by reading out the program 234 from the ROM 233 into the RAM 237, and executing it. Note that the printer 103 need not include the USB I/F 231.

The printer 103 can perform P2P communication with the PC 101 or the smartphone 104 via the USB cable 221 or wireless ad hoc connection 222. Furthermore, when the printer 103 is connected to the AP 102 by the wireless LAN (infrastructure connection) and the AP 102 is connected to the LAN 224 via the Ethernet cable 226, the printer 103 can be connected to the LAN 224.

The wireless profile 235 is information including the SSID of the AP 102 connected by the wireless LAN I/F 236 and authentication information (password or the like). The wireless profile 235 is stored or managed when the CPU 232 executes the program 234 stored in the ROM 233.

The ROM 233 also stores a unique SSID. The unique SSID is uniquely decided for, for example, the manufacturer of the printer or a printer model. The wireless LAN I/F 236 of the printer 103 can operate as an AP corresponding to the unique SSID.

P2P communication by the wireless ad hoc connection 222 according to this embodiment may be performed by a communication method in which no AP is used or a method in which the PC 101 or the printer 103 operates as an AP. For example, the wireless LAN I/F 236 operates as the AP corresponding to the unique SSID. In this case, the wireless LAN I/F 206 is connected to the wireless LAN I/F 236 operating as the AP corresponding to the unique SSID. In this method, the PC 101 or the smartphone 104 can be connected directly to the printer 103 by the same connection process as that of the external AP 102. Therefore, even if the PC 101 or the smartphone 104 cannot execute a process for ad hoc connection without intervention of an AP, P2P communication with the printer 103 is possible. That is, P2P communication between the smartphone 104 and the printer 103 may include wireless ad hoc connection or infrastructure mode connection.

Note that in the printer 103 according to this embodiment, the user can perform an operation of connecting the printer 103 to the desired AP in accordance with display of the display apparatus 238. For example, the user can connect the printer 103 to the AP by inputting the SSID and password corresponding to the desired AP on the display apparatus 238 of the printer 103.

The display apparatus 238 of the printer 103 may be in various forms in accordance with the type of the printer 103, such as a small LCD display, segment liquid crystal display, and flickering display by an LED. If, for example, the display apparatus 238 of the printer 103 is an LED that performs only flickering display, it is impossible to notify the user of sufficient information, as compared with an LCD display capable of displaying characters or an image, and it may thus be difficult to perform a user operation of connecting the printer 103 to the desired AP.

In a conventional form, one of the PC 101 and the smartphone 104 performs, for the printer 103, a wireless setting process of connecting the printer 103 to the predetermined AP. Therefore, for example, even a user who is not familiar with the operation of the printer 103 can readily connect the printer 103 to the desired AP. Especially, even if sufficient information cannot be displayed on the display apparatus 238 and it is difficult to perform an operation of connecting the printer 103 to the desired AP, the user can readily perform an operation in accordance with display on the display of the smartphone 104.

However, for example, the program for performing the connection process executed by the PC 101 may not be able to acquire, from the OS, the result of the AP search executed by the connected PC 101. In this case, the program for performing the connection process cannot specify the SSID of the printer 103, and thus the user needs to specify the SSID of the printer 103, and operate, for example, the GUI of the OS to perform a connection process of performing P2P connection between the PC 101 and the printer 103. If the user is not familiar with the operation of the PC 101, he/she may not be able to call the target function, and may not be able to perform the connection process. In addition, even if the user can call the target function, when, for example, there are many neighboring APs, it may be difficult to specify the SSID of the printer 103 and it may take time to perform the connection process.

To cope with this, in this embodiment, the PC 101 converts the information of the printer 103 and the information concerning the AP 102 into a two-dimensional code, and displays it on the display apparatus 208. The smartphone 104 images the displayed two-dimensional code by the imaging apparatus 207, and acquires the information from the acquired image of the two-dimensional code. Then, the smartphone 104 performs the AP search, and specifies the SSID of the printer 103 based on the result of the AP search and the information concerning the printer 103 acquired from the two-dimensional code, thereby performing P2P connection to the printer 103, instead of the PC 101. After that, the smartphone 104 performs a wireless setting process of connecting the printer 103 to the AP 102 using the information concerning the AP 102 acquired from the two-dimensional code.

Figure 3:
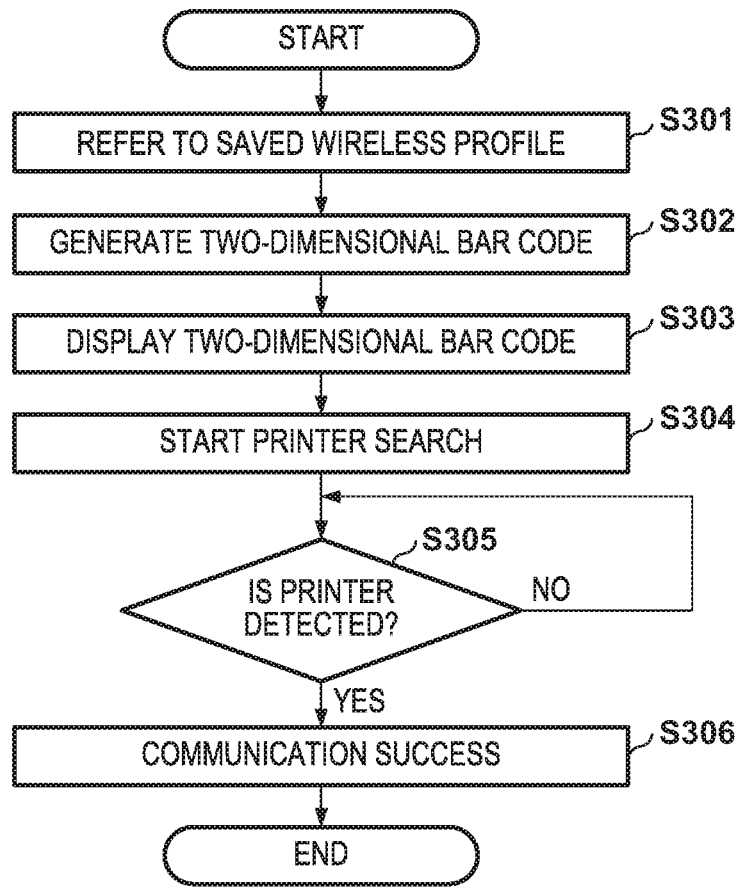
FIG. 3 is a flowchart illustrating an example of a process executed in a PC according to the embodiment.

FIG. 3 is a flowchart illustrating an example of a series of processes executed by the PC 101 to communicate with the printer. The process by the PC 101 is implemented when the CPU 201 executes the program 203. Assume that the PC 101 is already connected to the external AP 102, and the SSID, password, and encryption scheme of the AP 102 are stored in the wireless profile 204. Assume also that the program 203 of the PC 101 for performing the wireless setting process of the printer can acquire, from the OS, a result of performing the AP search under the restriction of the OS or the like. Assume also that the program 203 of the smartphone 104 can acquire, from the OS, a result of performing an AP search under the restriction of the OS or the like.

In the PC 101, the program (application or the like) of the wireless setting process included in the program 203 displays a predetermined screen on the display apparatus 208. When the user issues a predetermined instruction for the PC 101 to communicate with the printer 103 on the screen, the PC 101 starts a process for a wireless setting instruction. First, the PC 101 refers to the wireless profile 204 (step S301) to acquire the wireless profile 204 including the SSID of the AP 102 connected at the start of the process shown in FIG. 3.

Figure 4:
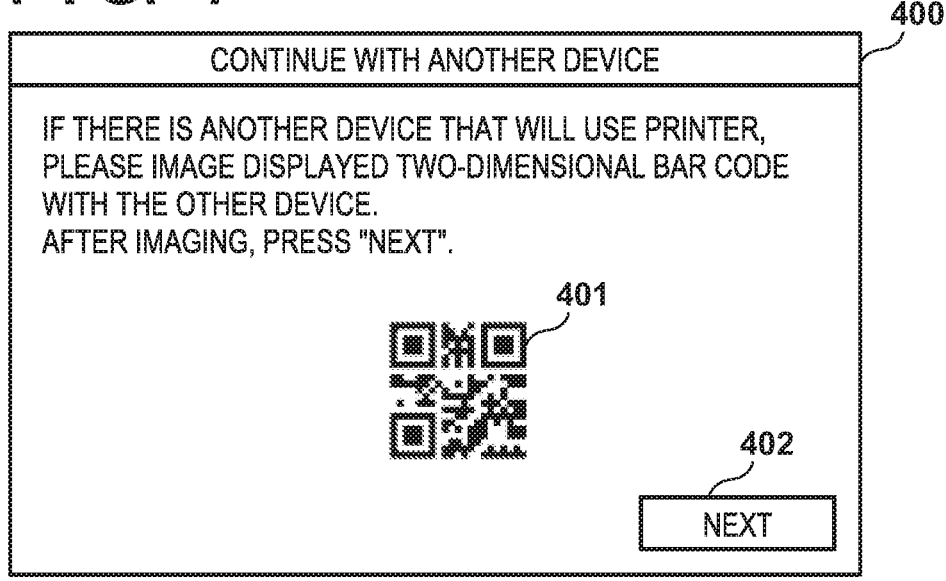
FIG. 4 is a view showing an example of a two-dimensional code display screen of the PC according to the embodiment.

The PC 101 generates a two-dimensional code including the SSID, password, and encryption scheme included in the wireless profile 204 acquired in step S301 and the unique identification information stored in the ROM 202 (step S302), and displays a two-dimensional code display screen 400 shown in FIG. 4 on the display apparatus 208 (step S303). On the other hand, the two-dimensional code is imaged by the smartphone 104, as will be described later, and the smartphone 104 performs the wireless setting process of the printer 103 using the information acquired from the two-dimensional code. The two-dimensional code display screen 400 shown in FIG. 4 includes a two-dimensional code 401 and a "next" button 402. If the user presses the "next" button 402 on the two-dimensional code display screen 400, the PC 101 searches for the printer 103 by infrastructure connection via the AP 102 (step S304), and determines whether the printer 103 can be detected (step S305). More specifically, in step S304, the PC 101 receives identification information (printer model name, serial number, or the like) from the apparatus connected to the AP 102. It is then determined whether the received identification information includes identification information matching the unique identification information stored in the ROM 202. If it is determined in step S305 that the printer 103 is detected, it is determined that communication with the printer 103 succeeds (step S306), and the process ends. Note that the determination process in step S305 is continuously performed until the printer 103 is detected.

Note that the two-dimensional code 401 may include the URL of the download page of the program (application or the like) of the wireless setting process to be installed on the smartphone 104. Thus, it is possible to readily install the application by imaging the two-dimensional code even if the application is not installed on the smartphone 104. In this case, after installing the application and activating it, it is necessary to image again the two-dimensional code imaged above.

Figure 5A:
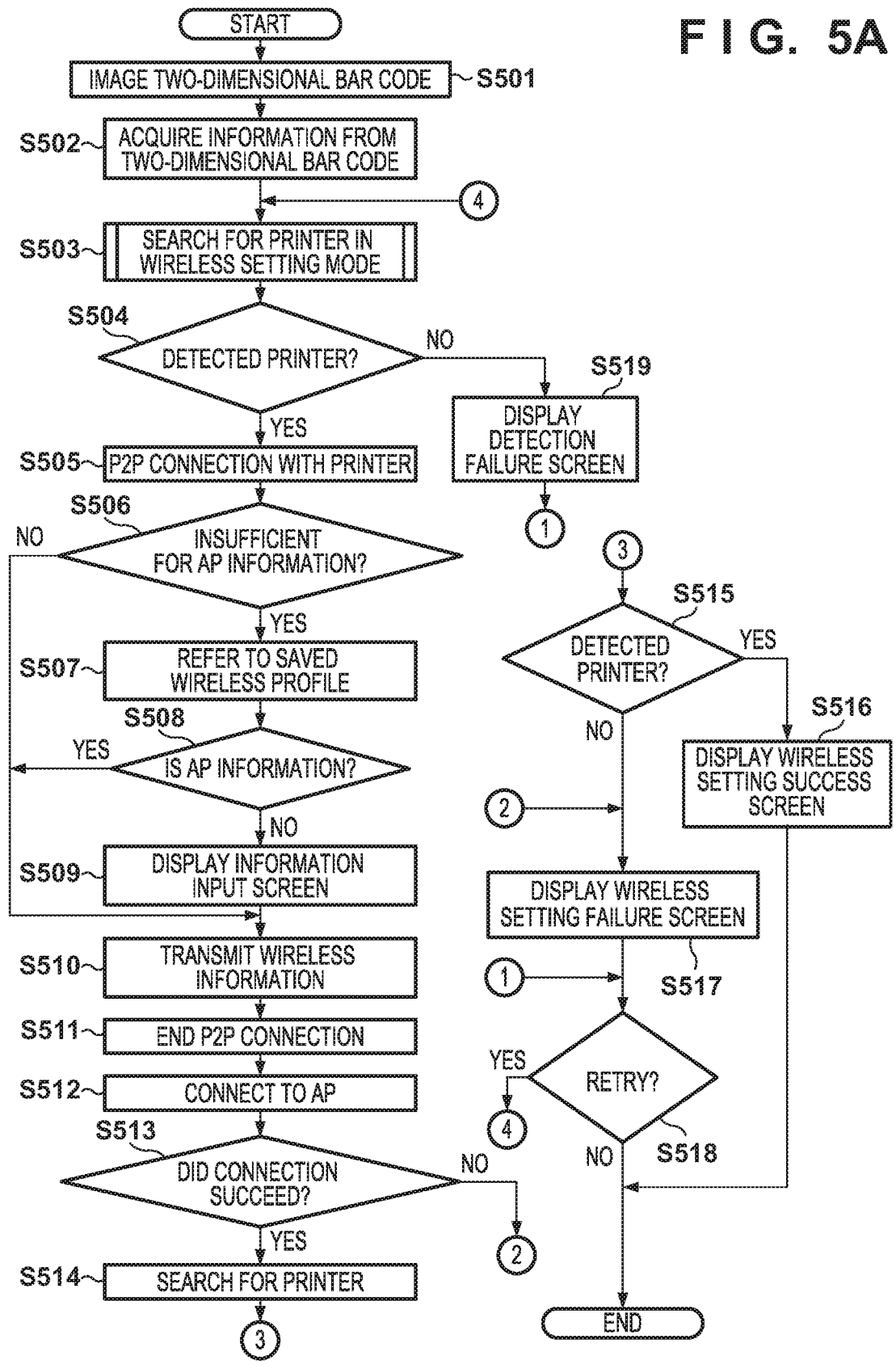
FIG. 5A is a flowchart illustrating an example of a process executed in a smartphone according to the embodiment.

FIG. 5A is a flowchart illustrating an example of the process of the smartphone 104 for instructing to execute the wireless setting process. The process shown in FIG. 5A is implemented when the CPU 201 executes the program 203. Similarly, the process by the printer 103 is implemented when the ROM 242 executes a program 243.

When the user instructs to execute the program (application or the like) of the wireless setting process included in the program 203 in the smartphone 104, a predetermined screen is displayed on the display apparatus 208. When the user performs a predetermined operation of connecting the smartphone 104 to the printer 103 on the screen, the smartphone 104 starts a process of instructing the printer 103 to execute the wireless setting process. The smartphone 104 images, by the imaging apparatus 207, the two-dimensional code displayed on the display apparatus 208 of the PC 101 (step S501), and acquires the information included in the imaged two-dimensional code (step S502). Next, the smartphone 104 searches for the printer 103 in a wireless setting mode (to be described later) (step S503), and determines, based on a detection result, whether the SSID of the printer is detected (step S504). More specifically, the AP corresponding to the unique SSID is searched for, and it is determined whether the search succeeds. The search process in step S503 will be described later with reference to FIG. 6.

If it is determined in step S503 that the printer in the wireless setting mode is detected (the AP of the unique SSID is detected) (YES in step S504), the smartphone 104 performs P2P connection to the printer 103 (step S505). More specifically, the smartphone 104 connects the wireless LAN I/F 246 to the access point (printer 103) of the unique SSID.

Figure 8A:
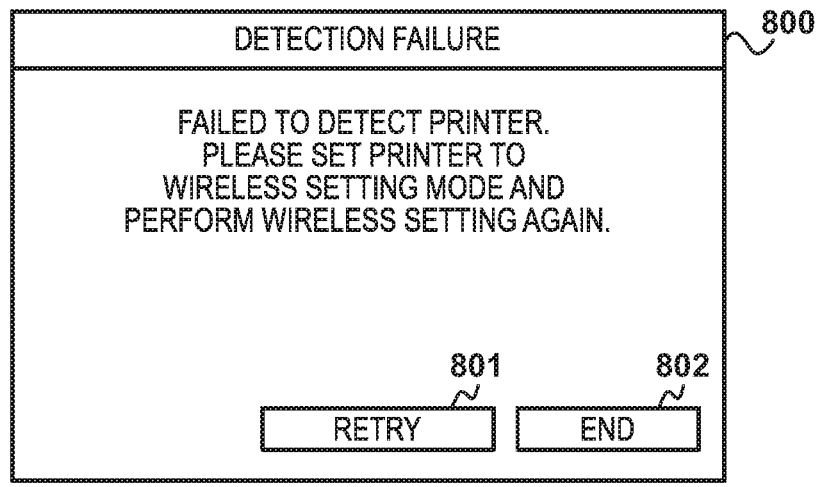
FIGS. 8A to 8C are views showing examples of various message screens displayed on the smartphone according to the embodiment.

On the other hand, if it is determined that detection of the printer in the wireless setting mode fails (the AP of the unique SSID is not detected) (NO in step S504), the smartphone 104 displays a detection failure screen 800 shown in FIG. 8A on the display apparatus 208 (step S519). If the user presses an "end" button 802 of the detection failure screen 800 (NO in step S518), the smartphone 104 ends the wireless setting instruction process. If the user presses a "retry" button 801 (YES in step S518), the smartphone 104 returns the process to the process (step S503) of searching again for the printer 103 in the wireless setting mode.

Next, the smartphone 104 determines whether the information of the AP 102 acquired from the two-dimensional code is insufficient (step S506). More specifically, the smartphone 104 determines in step S506 whether the information acquired from the two-dimensional code includes the SSID, password, and encryption scheme of the AP 102. If the smartphone 104 determines that the information acquired from the two-dimensional code is insufficient (YES in step S506), the smartphone 104 refers to the wireless profile 204 (step S507), and determines whether there is a wireless profile including the SSID of the AP 102 (step S508). If it is determined in step S508 that there is no wireless profile, the smartphone 104 displays an AP information input screen shown in FIG. 7 on the display apparatus 208 (step S509).

The AP information input screen 700 shown in FIG. 7 includes an SSID 701 of the AP, a password 702, an encryption scheme 703, a WEP key selection portion 704, and a "next" button 705. In the SSID 701, the SSID of the AP 102 is displayed. The password 702 accepts an input from the user by a text box. In the encryption scheme 703, an encryption scheme can be selected from a plurality of candidates in a list box. If the SSID 701 is encrypted by WEP, the smartphone 104 enables the WEP key selection portion 704 to perform display so as to prompt the user to select a WEP key. If the "next" button 705 of the AP information input screen 700 is pressed, the smartphone 104 stores the input information in the ROM 202, and closes the AP information input screen 700.

If a desired condition is satisfied in step S506, the smartphone 104 transmits, to the printer 103, the information to be used to establish connection to the AP 102 (step S510). The desired condition corresponds to a case in which the smartphone determines that the information of the AP 102 acquired from the two-dimensional code is sufficient, a case in which it is determined in step S508 that there is a wireless profile including the SSID of the AP 102, or a case in which it is determined in step S509 that the information of the AP 102 is input. In step S510, the smartphone 104 transmits the information (including the SSID, password, and encryption scheme) concerning the AP 102 to the printer 103. Next, the smartphone 104 disconnects the connection from the printer 103 (step S511), and is connected to the AP 102 (step S512). In step S512, the smartphone 104 performs a connection process to the AP 102 using the information of the AP 102 transmitted to the printer 103 in step S510. Therefore, the smartphone 104 can be connected to the AP 102 without requiring the user to reinput the password or the like.

Figure 8B:
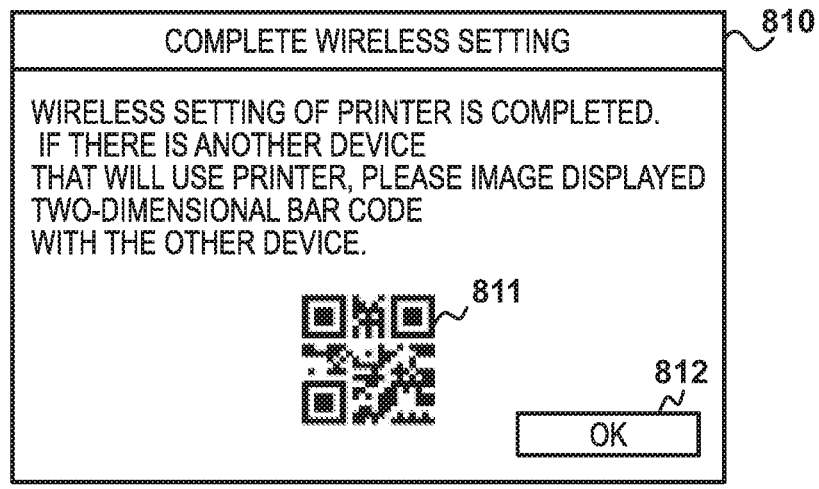

The smartphone 104 determines whether connection to the AP 102 succeeds (step S513). If the smartphone 104 determines that connection succeeds (YES in step S513), the printer 103 is searched for in infrastructure connection via the AP 102 (step S514), and it is determined whether the printer 103 can be detected (step S515). More specifically, in step S514, the smartphone 104 receives identification information (printer model name, serial number, or the like) from the apparatus connected to the AP 102. Then, it is determined whether the received identification information includes identification information matching the unique identification information stored in the ROM 202. If it is determined in step S515 that the printer 103 can be detected (YES in step S515), the smartphone 104 displays a setting success screen 810 shown in FIG. 8B on the display apparatus 208 (step S516). If the user presses an "OK" button 812 on the setting success screen 810, the smartphone 104 ends the wireless setting instruction process.

Note that the smartphone 104 may be connected to the printer 103 at a timing of determining in step S515 that the printer 103 can be detected or at a timing of pressing the "OK" button 812.

Note that a two-dimensional code 811 including the information of the AP 102 for setting another information processing apparatus different from the PC 101 and the smartphone 104 to be communicable with the printer 103 and information such as an IP address for identifying the printer 103 on the wireless network may be displayed on the setting success screen 810. By imaging the two-dimensional code and acquiring the information, the other information processing apparatus can be connected to the AP 102, can specify the printer 103 on the wireless network, and can perform communication without inputting any information by the user.

Figure 8C:
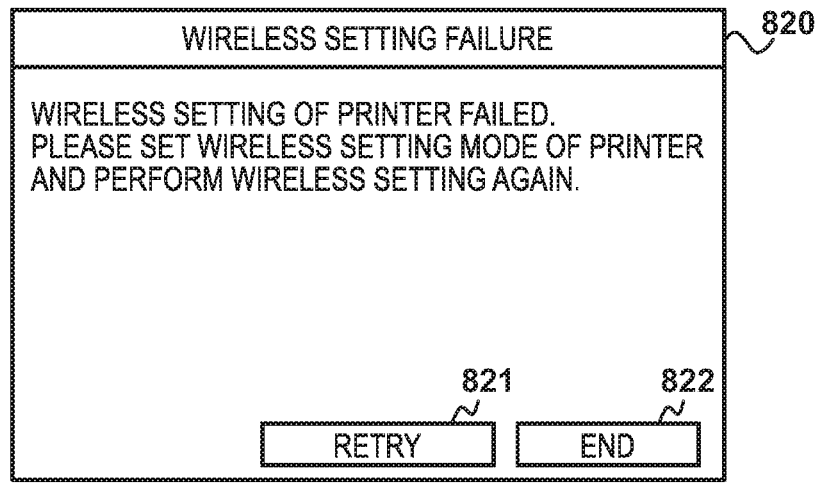

On the other hand, if it is determined that wireless setting of the printer 103 by the process in step S512 or S514 fails, the smartphone 104 displays, as error display, a setting failure screen 820 shown in FIG. 8C on the display apparatus 208 (step S517). If the user presses an "end" button 822 on the setting failure screen 820, the smartphone 104 determines not to retry the wireless setting instruction (NO in step S518), and ends the wireless setting instruction process. If the user presses a "retry" button 821, the smartphone 104 determines to retry the connection setting process (YES in step S518), and returns the process to step S503 to search again for the printer 103 in the wireless setting mode.

The wireless setting process executed by the printer 103 will be described with reference to FIG. 5B. The process shown in FIG. 5B may start under the condition that the user issues, as the predetermined instruction, an instruction to shift to the wireless setting mode or another condition. For example, an arrangement of temporarily shifting to the wireless setting mode under the condition that a non-wireless connection state is obtained at the time of power-on of the printer 103 or that the printer 103 is powered on for the first time after purchase or initialization.

If the wireless setting process starts, the printer 103 shifts to the wireless setting mode, operates the wireless LAN I/F 236 as the AP having the unique SSID, and completes preparation of P2P connection (step S551). More specifically, the printer 103 operates the wireless LAN I/F 236 as the AP of the unique SSID, and stands by for a connection request in an ad hoc mode. In this state, if the smartphone 104 executes the processes in step S503 to S505, the printer 103 starts P2P communication in response to the connection request from the smartphone 104.

Next, the printer 103 confirms whether a wireless setting instruction is received from the smartphone 104 (step S553). If it is determined that no wireless setting instruction is received (NO in step S553), the printer 103 returns the process to step S552. If it is determined in step S553 that the wireless setting instruction is received (YES in step S553), the printer 103 tries to establish connection to the AP 102 designated from the smartphone 104 (step S554). More specifically, in step S554, the printer 103 tries to establish connection to the AP 102 using the SSID, password, and encryption scheme included in the wireless profile received from the smartphone 104. Then, the printer 103 determines whether connection establishment succeeds (step S555). If it is determined that connection establishment fails, the printer 103 notifies the user of the failure of wireless setting via the display apparatus 238 of the printer 103 (step S556). When the user performs an operation of eliminating the setting error notified on the display apparatus 238 of the printer 103, the printer 103 ends the wireless setting process. Even if it is determined in step S555 that the connection process succeeds, the printer 103 ends the wireless setting process.

Figure 6:
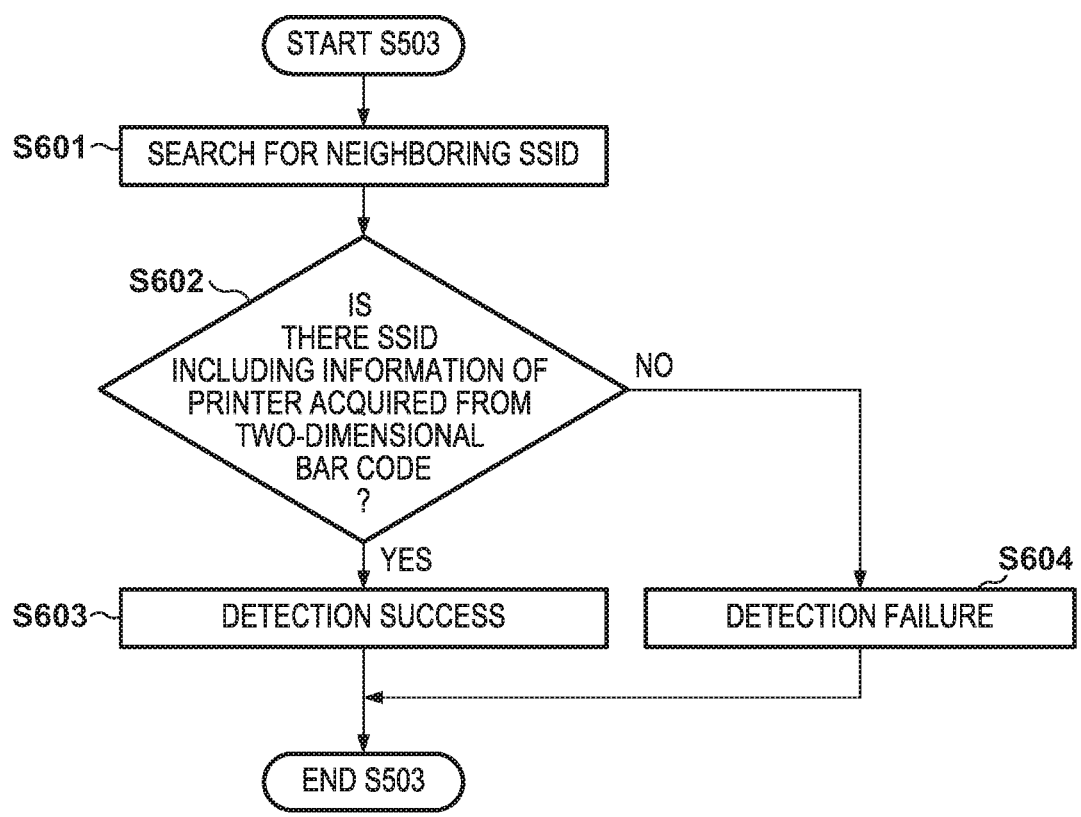
FIG. 6 is a flowchart illustrating an example of a process of searching for a printer in a wireless setting mode in the smartphone according to the embodiment.

The printer search process executed by the smartphone 104 in step S503 will be described with reference to FIG. 6. If the smartphone 104 starts a process of searching for a printer in the wireless setting mode, it searches for neighboring SSIDs (step S601). More specifically, the smartphone 104 issues an SSID search instruction to the OS. Next, the smartphone 104 acquires a list of SSIDs detected by the OS, and determines whether the list includes an SSID unique to the printer 103, which includes the unique identification information of the printer 103 acquired in step S502 (step S602). If it is determined in step S602 that the SSID unique to the printer 103 is included (YES in step S602), it is determined that detection of the printer 103 in the wireless setting mode succeeds (step S603), and the process of searching for the printer in the wireless setting mode ends (step S605). On the other hand, if it is determined in step S602 that the SSID unique to the printer 103 is not included (NO in step S602), it is determined that detection of the printer 103 in the wireless setting mode fails (step S604), and the process of searching for the printer in the wireless setting mode ends.

Other Examples

An example of the process of a setup program by the PC 101 for connecting the printer 103 to the wireless LAN will be described next.

First, an example of a process of starting a wireless LAN setup process on the printer side will be described with reference to FIG. 17.

Figure 17:
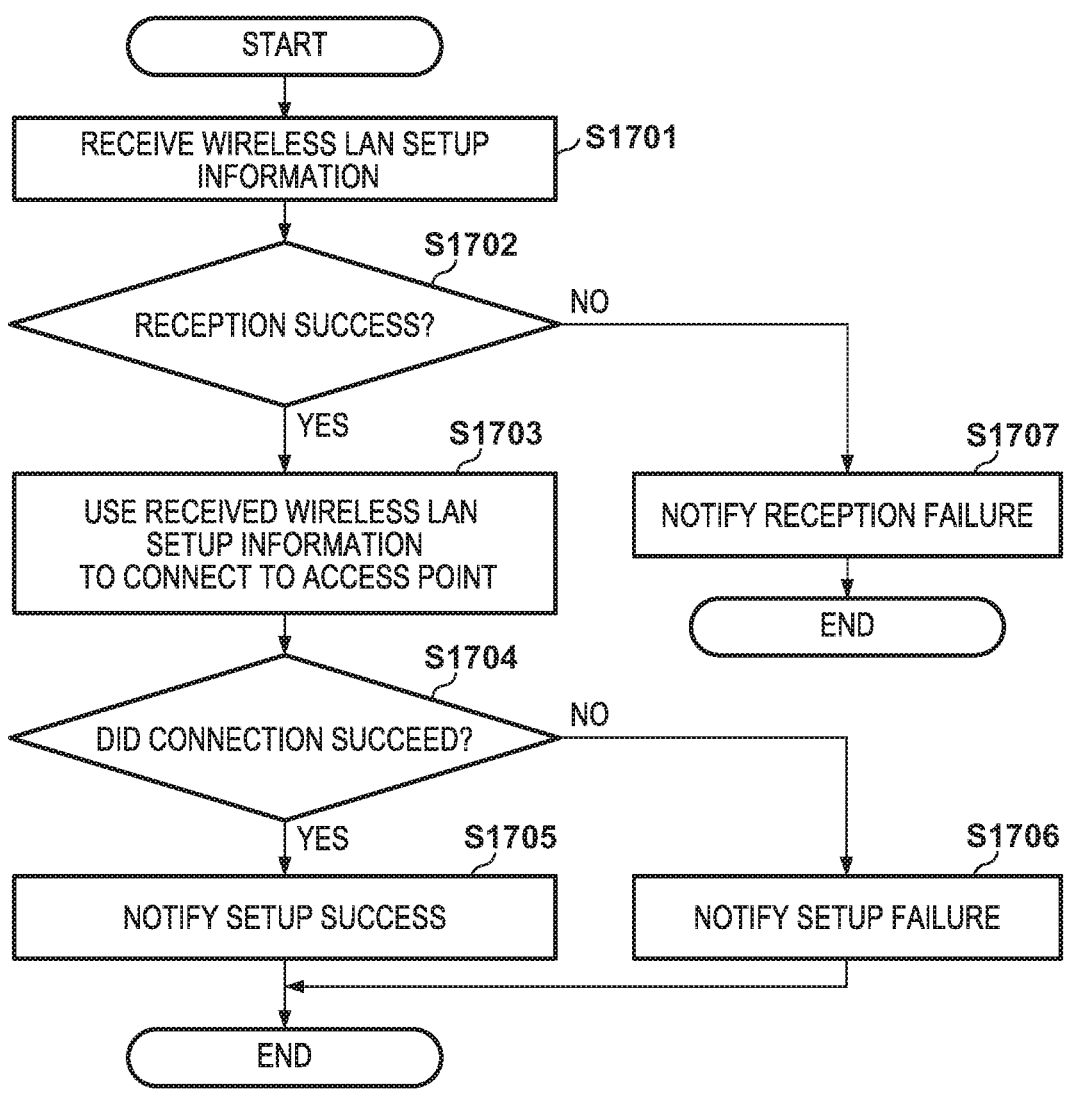
FIG. 17 is a flowchart illustrating an example of a wireless LAN setup process of the printer according to the embodiment.

FIG. 17 is a flowchart illustrating an example of a process implemented when the CPU 232 of the printer 103 executes the program 234 stored in the ROM 233. The process shown in FIG. 17 is executed by the printer 103 that receives, from the user, an instruction to shift to a wireless LAN setup mode by direct wireless connection. In one example, the printer 103 receives the instruction via the input I/F 239.

In step S1701, the printer 103 stands by for a predetermined time until it receives wireless LAN setup information. More specifically, the printer 103 stands by until it receives access information from the PC 101 or the smartphone 104. The access information includes, for example, the SSID of the access point 102 and the password used to perform connection to the access point 102. Next, the printer 103 advances the process to step S1702, and determines whether the wireless LAN setup information is received. If reception of the wireless LAN setup information fails (NO in step S1702), the printer 103 advances the process to step S1707, and displays a reception failure message, thereby ending the process shown in FIG. 17. If the wireless LAN setup information is received (YES in step S1702), the printer 103 advances the process to step S1703. In step S1703, the printer 103 tries to perform connection to the access point 102 using the received access information. In step S1704, the printer 103 determines whether connection to the access point 102 succeeds. If connection from the printer 103 to the access point fails (NO in step S1704), the printer 103 advances the process to step S1706, and displays, on the display apparatus 238, a message indicating that the wireless LAN setup fails, thereby ending the process. If connection from the printer 103 to the access point succeeds (YES in step S1704), the printer 103 advances the process to step S1705, and displays, on the display apparatus 238, a message indicating that the wireless LAN setup succeeds, thereby ending the process shown in FIG. 17.

Figure 19:
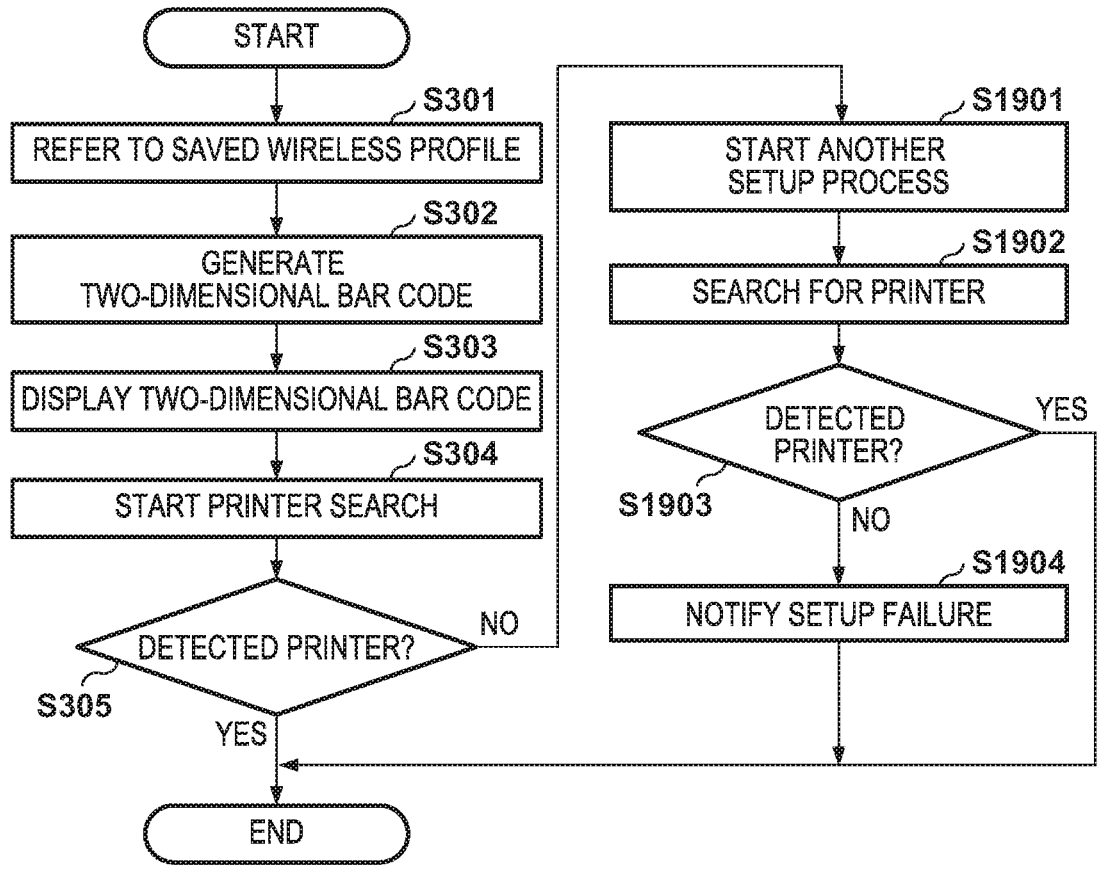
FIG. 19 is a flowchart illustrating an example of a setup process executed by the PC to perform a wireless LAN setup of the printer according to the embodiment.

An example of the process of a setup program by the PC 101 to perform the wireless LAN setup of the printer 103 will be described next with reference to FIG. 19. The procedure of the process of the PC 101 will be described below in accordance with the flowchart shown in FIG. 19. The process shown in FIG. 19 is implemented when the CPU 201 of the PC 101 that has accepted an execution instruction of the setup process from the user executes the setup program stored in the ROM 202. Assume that the user executes the process shown in FIG. 17 to perform the wireless LAN setup of the printer 103 by direct wireless connection in accordance with the flowchart shown in FIG. 17.

Processes in steps S301 to S305 have been explained with reference to FIG. 3 and a description thereof will be omitted. If it is determined in step S305 that no printer is detected (NO in step S305), the PC 101 advances the process to step S1901, and executes another wireless LAN setup method. In this embodiment, "manual setting", "setting by button of router", or the like can be selected. If, for example, "manual setting" is selected, the user inputs the SSID and password of the access point 102 to perform connection to the access point 102 by operating the input OF 239 of the printer 103. If "setting by button of router" is selected, the user presses a WPS button (not shown) of the access point 102 and the input I/F of the printer 103 to cause the printer 103 and the access point 102 to execute a WPS (Wi-Fi Protected Setup) process.

Next, the PC 101 advances the process to step S1902, and searches for the printer 103 for which the wireless LAN setup is complete. The search is executed by transmitting/receiving a specific command between the PC 101 and the printer 103. The PC 101 advances the process to step S1903, and determines whether the printer 103 is detected. If, for example, it is determined that the specific command is normally transmitted/received in step S1902, the PC 101 determines that the printer 103 is detected. If the PC 101 determines that the printer 103 is detected (YES in step S1903), the process shown in FIG. 19 ends. If, for example, the specific command is not normally transmitted/received, and the PC 101 determines that the printer 103 cannot be detected (NO in step S1903), the PC 101 advances the process to step S1904, and notifies the user of the failure of the setup, thereby ending the process shown in FIG. 19.

Second Embodiment

For example, an application that currently performs a connection process of a PC may not be able to acquire, from an OS (Operating System), part of information concerning an access point, such as the password of the access point. At this time, a printer may not be able to be connected to the access point using only the information of the access point received from the PC. In this case, therefore, it is necessary to prompt the user to input the information of the access point such as the password on the PC.

However, if the user erroneously inputs the password or the like, the printer that receives the password fails to perform connection to the access point, resulting in a connection error. Therefore, the user waits for the connection error of the printer, and then recognizes the erroneous input of the password. In addition, if the connection error occurs in the printer, the user needs to move to the printer, and perform an operation of eliminating the error and prepare the printer for reconnection. The password may be complicated to ensure security, and the user may readily, erroneously input the password, as described above.

In this embodiment, information of a connection destination printer including an SSID and part of information concerning an access point including an SSID are converted into one two-dimensional bar code, and the two-dimensional bar code is displayed on the display unit of a PC. Then, the two-dimensional bar code is imaged by an application that operates on another information processing apparatus and can acquire, from an OS, the information concerning the access point necessary for connection. The other information processing apparatus and the printer are directly, wirelessly connected to each other using the SSID of the printer acquired from the imaged two-dimensional bar code. Then, the other information processing apparatus acquires the information concerning the access point from a wireless profile that is linked with the SSID of the access point acquired from the two-dimensional bar code and saved in the other information processing apparatus, and transmits the acquired information to the printer. The printer performs connection to the access point using the acquired information. This can reduce the labor of prompting the user to input the information of the access point such as the password, and also reduce risk of a failure in connection caused by erroneous input of the information of the access point by the user.

This embodiment will be described in detail below. Note that a description of the same components, processes, and functions as those in the first embodiment will be omitted.

FIG. 9 is a flowchart illustrating an example of a series of processes executed by a PC to communicate with a printer. The process shown in FIG. 9 is implemented when a CPU 201 executes a program 203 stored in a ROM 202. Note that a PC 101 is already connected to an external access point 102, and the SSID, password, and encryption scheme of the access point 102 are stored in a wireless profile 204. Assume that the program 203 cannot acquire, from an OS, the password of the access point stored in the wireless profile 204 due to the restriction of the OS or the like.

In the PC 101, a predetermined screen is displayed on a display apparatus 208 by a program (application or the like) of a wireless setting process included in the program 203. When the PC 101 receives a predetermined instruction to communicate with a printer 103 from the user on the screen, the PC 101 starts a process for a wireless setting instruction.

The PC 101 refers to the wireless profile 204 (step S901) to acquire a wireless profile including the SSID of the access point 102 connected at the start of the process shown in FIG. 9.

The PC 101 advances the process to step S902, and executes an AP search to acquire an AP search result from the OS. Subsequently, the PC 101 determines whether the AP search result includes an SSID (to be referred to as a unique SSID hereinafter) including unique identification information stored in the ROM 202. If the unique SSID is included, the PC 101 generates a two-dimensional bar code including the unique SSID and the SSID included in the wireless profile acquired in step S901 (step S904), and displays a two-dimensional bar code display screen 400 shown in FIG. 4 on the display apparatus 208 (step S905). If the unique SSID is not included, it is assumed that the two-dimensional bar code generated in step S904 includes the above-described unique identification information instead of the unique SSID. The two-dimensional bar code display screen 400 includes a two-dimensional bar code 401 and a "next" button 402. If the user presses the "next" button 402 on the two-dimensional bar code display screen 400, the PC 101 searches for the printer 103 by infrastructure connection via the access point 102 (step S906), and determines whether the printer 103 can be detected (step S907). More specifically, in step S906, the PC 101 receives identification information (printer model name or the like) from an apparatus connected to the access point 102. Then, it is determined whether the received identification information includes identification information matching the unique identification information stored in the ROM 202. If the identification information is included, it is determined that the printer 103 is detected. On the other hand, the two-dimensional bar code is imaged by a smartphone 104, as will be described later, and the smartphone 104 performs a wireless setting process for the printer 103 using the information acquired from the two-dimensional bar code. If it is determined in step S907 that the printer 103 is detected, it is determined that communication with the printer 103 succeeds, thereby ending the process shown in FIG. 9. Note that the determination process in step S907 is continuously performed until the printer 103 is detected.

Note that the two-dimensional bar code 401 may include the URL of the download page of the program (application or the like) of the wireless setting process to be installed on the smartphone 104. Thus, it is possible to readily install the application by imaging the two-dimensional bar code even if the application is not installed on the smartphone 104. In this case, after installing the wireless setting application and activating it, the two-dimensional bar code imaged above is imaged again.

Figure 10:
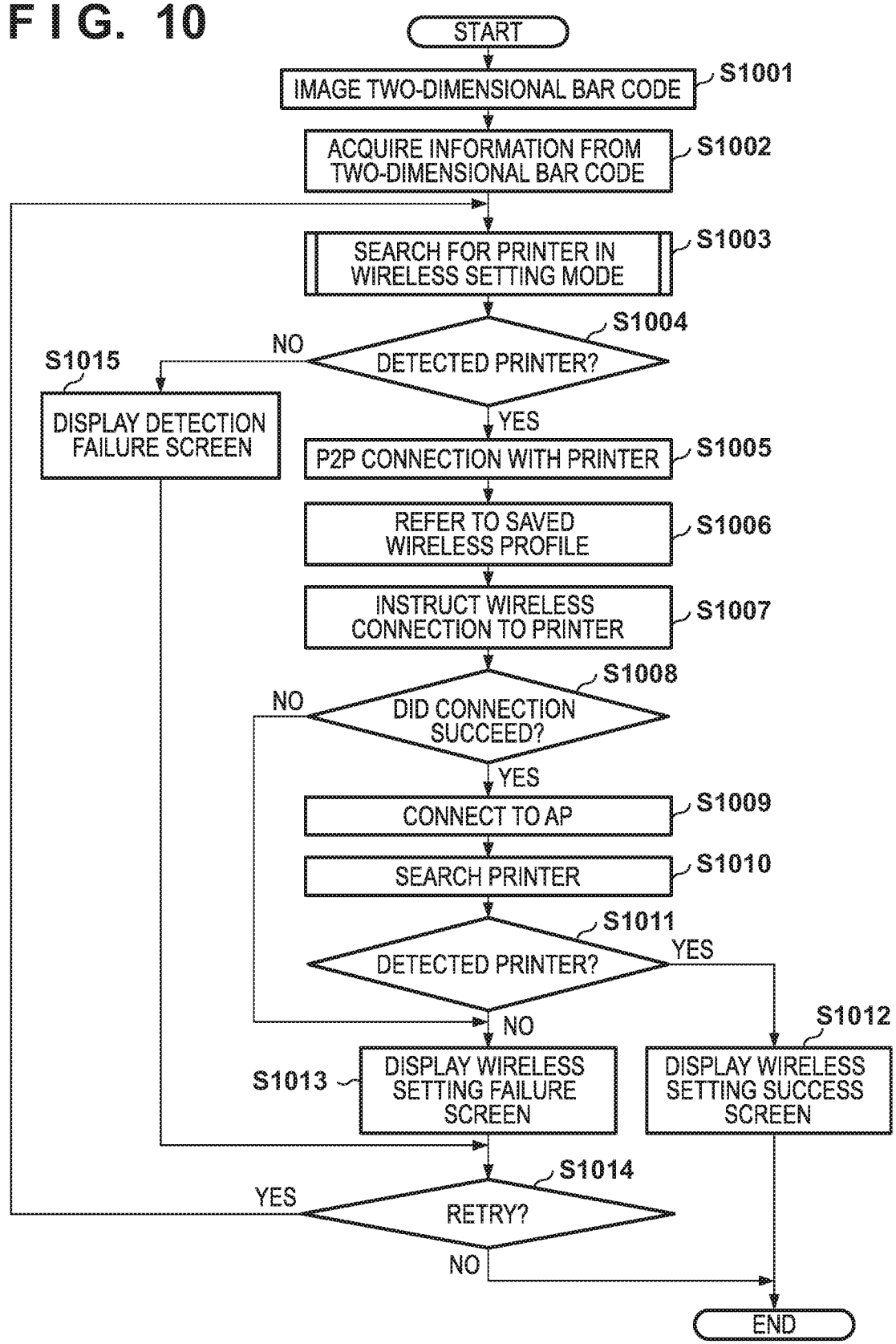
FIG. 10 is a flowchart illustrating an example of a process executed in a smartphone according to the other embodiment.

FIG. 10 is a flowchart illustrating an example of a process of instructing wireless connection by transmitting a wireless setting to the printer 103 by the smartphone 104. A process by the smartphone 104 is implemented when a CPU 241 executes a program 243 stored in a ROM 242. Similarly, a process by the printer 103 is implemented when a CPU 232 executes a program 234 stored in a ROM 233.

In the PC 101, a predetermined screen is displayed on the display apparatus 208 by the program (application or the like) of the wireless setting process included in the program 203. When the user issues a predetermined instruction to connect the PC 101 to the printer on the screen, the PC 101 starts a process for a wireless setting instruction. The smartphone 104 starts the process shown in FIG. 10 by activating an application for instructing the printer 103 to perform wireless connection.

First, the smartphone 104 images, by an imaging apparatus 207, a two-dimensional bar code displayed on the PC 101 (step S1001), and acquires information included in the imaged two-dimensional bar code (step S1002). Next, the smartphone 104 searches for the printer 103 in a wireless setting mode (to be described later) (step S1003), and determines whether the printer 103 is detected (step S1004). More specifically, the smartphone 104 searches for the printer 103 corresponding to the above-described unique SSID, and determines whether the printer 103 corresponding to the unique SSID is detected. The search process in step S1003 has been explained with reference to FIG. 6 and a detailed description thereof will be omitted.

If it is determined that the printer in the wireless setting mode is detected (the access point of the unique SSID is detected) in step S1003 (YES in step S1004), the smartphone 104 performs wireless direct connection (wireless ad hoc connection) to the printer 103 (step S1005). More specifically, the smartphone 104 is connected to the access point of the unique SSID via a wireless LAN I/F 246.

On the other hand, if it is determined that detection of the printer in the wireless setting mode fails (NO in step S1004), the smartphone 104 displays a detection failure screen 800 shown in FIG. 8A on the display apparatus 208 (step S1015). If the user presses an "end" button 802 of the detection failure screen 800 (NO in step S1014), the smartphone 104 ends the wireless setting instruction process shown in FIG. 10. If the user presses a "retry" button 801 (YES in step S1014), the smartphone 104 returns the process to step S1003, and searches again for the printer 103 in the wireless setting mode.

Next, the smartphone 104 refers to the wireless profile 204 (step S1006) to acquire the wireless profile including the SSID of the access point 102. Then, the smartphone 104 transmits information for instructing wireless setting to the printer 103 (step S1007). More specifically, in step S1007, the smartphone 104 transmits the information (including the SSID, password, and encryption scheme) of the access point 102 to the printer 103.

Next, the smartphone 104 determines whether connection to the access point 102 succeeds (step S1008). If connection success is determined (YES in step S1008), the smartphone 104 disconnects the wireless ad hoc connection from the printer 103, and is connected to the access point 102 (step S1009). In step S1009, the smartphone 104 performs a connection process to the access point 102 using the information of the access point 102 transmitted to the printer 103 in step S1007. Therefore, the smartphone 104 can perform reconnection to the access point 102 without requiring the user to reinput the password or the like. Next, the smartphone 104 searches for the printer 103 by infrastructure connection via the access point 102 (step S1010), and determines whether the printer 103 can be detected (step S1011). More specifically, in step S1010, the smartphone 104 receives identification information (printer model name or the like) from the apparatus connected to the access point 102. Then, it is determined whether the received identification information includes identification information matching the unique identification information stored in the ROM 202. If it is determined in step S1011 that the printer 103 can be detected, the smartphone 104 displays a setting success screen 810 shown in FIG. 8B on the display apparatus 208 (step S1012). If the user presses an "OK" button 812 on the setting success screen 810, the smartphone 104 ends the wireless setting instruction process. Note that the smartphone 104 may be connected to the printer 103 at a timing of determining in step S1011 that the printer 103 can be detected or a timing of pressing the "OK" button 812. Note also that a two-dimensional bar code 811 including the information of the access point 102 and information, such as the IP address of the printer 103, for identifying the printer 103 on a wireless network may be displayed on the setting success screen 810 in order to set another information processing apparatus different from the PC 101 and the smartphone 104 to be communicable with the printer 103. By imaging the two-dimensional bar code to acquire the information, the other information processing apparatus can be connected to the access point 102 to specify the printer 103 on the wireless network and communicate with the printer 103 without inputting the information by the user.

On the other hand, if it is determined that wireless setting in the printer 103 fails in one of the processes in steps S1008 and S1011, the smartphone 104 displays, as error display, a setting failure screen 820 shown in FIG. 8C on the display apparatus 208 (step S1013). If the user presses an "end" button 822 on the setting failure screen 820 (NO in step S1014), the smartphone 104 ends the wireless setting instruction process shown in FIG. 10. If the user presses a "retry" button 821 (YES in step S1014), the smartphone 104 returns to the process (step S1003) of searching again for the printer 103 in the wireless setting mode.

The wireless setting process of the printer 103 is the same as in the first embodiment and a description thereof will be omitted.

Other Examples

An example of the process of a setup program by the PC 101 for performing a wireless LAN setup of the printer 103 will be described next.

First, an example of a process of starting a wireless LAN setup process on the printer side will be described with reference to FIG. 17.

FIG. 17 is a flowchart illustrating an example of a process implemented when the CPU 232 of the printer 103 executes the program 234 stored in the ROM 233.

First, in step S1701, the printer 103 receives, from the user, an instruction to shift to a wireless LAN setup mode by direct wireless connection. In one example, the printer 103 receives the instruction via an input I/F 239. Next, the printer 103 stands by for a predetermined time until it receives wireless LAN setup information. More specifically, the printer 103 stands by until it receives access information from the PC 101 or the smartphone 104. The access information includes, for example, the SSID of the access point 102 and the password used to perform connection to the access point 102. Next, the printer 103 advances the process to step S1702, and determines whether the wireless LAN setup information is received. If reception of the wireless LAN setup information fails (NO in step S1702), the printer 103 advances the process to step S1707, and displays a reception failure message, thereby ending the process shown in FIG. 17. If the wireless LAN setup information is received (YES in step S1702), the printer 103 advances the process to step S1703. In step S1703, the printer 103 tries to perform connection to the access point 102 using the received access information. In step S1704, the printer 103 determines whether connection to the access point 102 succeeds. If connection from the printer 103 to the access point fails (NO in step S1704), the printer 103 displays, on the display apparatus 238, a message indicating that the wireless LAN setup fails, thereby ending the process (step S1706). If connection from the printer 103 to the access point succeeds (YES in step S1704), the printer 103 displays, on the display apparatus 238, a message indicating that the wireless LAN setup succeeds (step S1705), thereby ending the process shown in FIG. 17.

An example of the process of the setup program by the PC 101 to perform the wireless LAN setup of the printer 103 will be described next with reference to FIG. 11. The procedure of the process of the PC 101 will be described below in accordance with the flowchart shown in FIG. 11.

Figure 11:
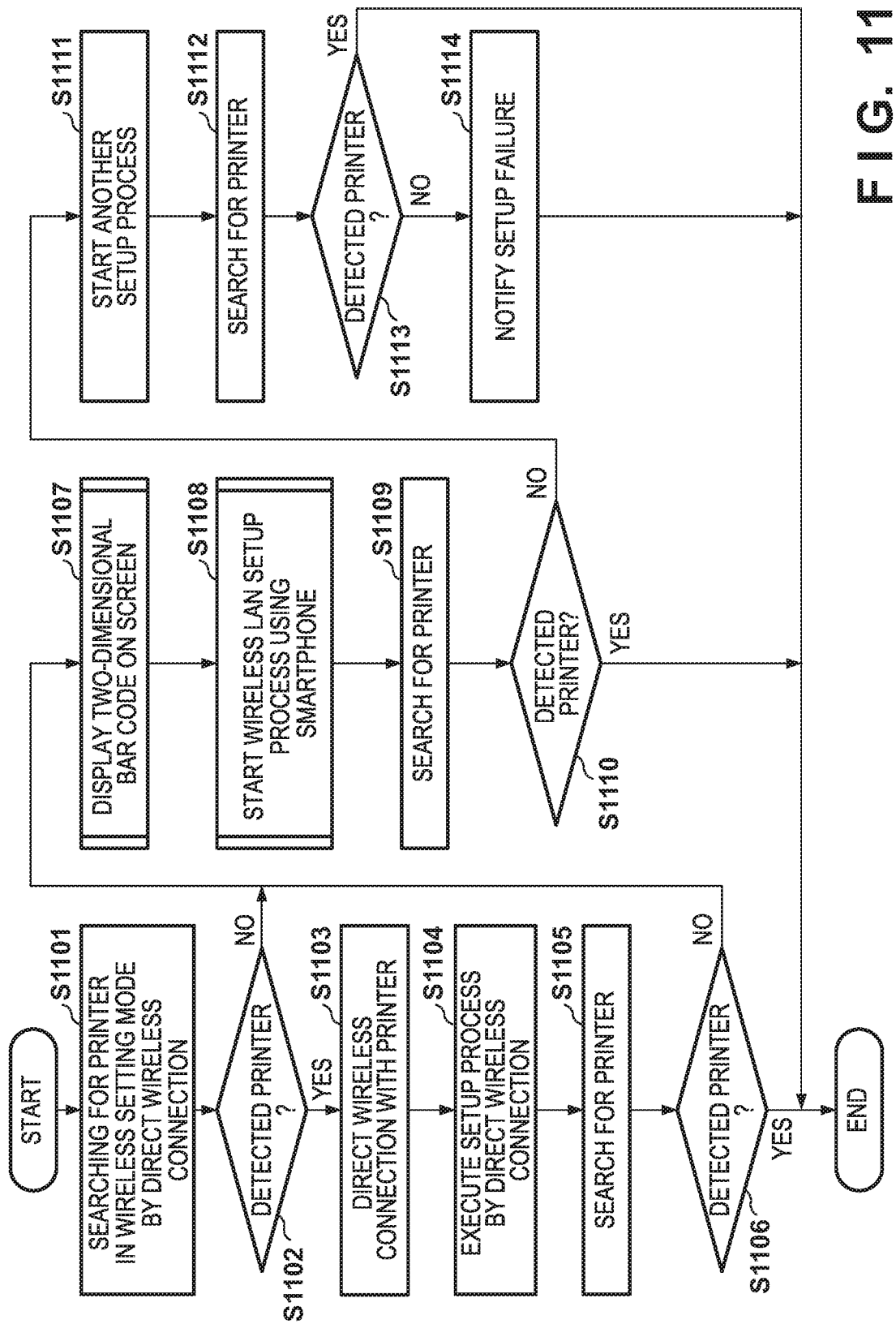
FIG. 11 is a flowchart illustrating an example of a setup process executed by the PC to perform a wireless LAN setup of a printer according to the other embodiment.

Note that the process shown in FIG. 11 is implemented when the CPU 201 of the PC 101 that has accepted an execution instruction of the setup process from the user executes the setup program stored in the ROM 202. Assume that the user executes the process shown in FIG. 17 to perform the wireless LAN setup of the printer 103 by direct wireless connection in accordance with the flowchart shown in FIG. 17.

Figure 18:
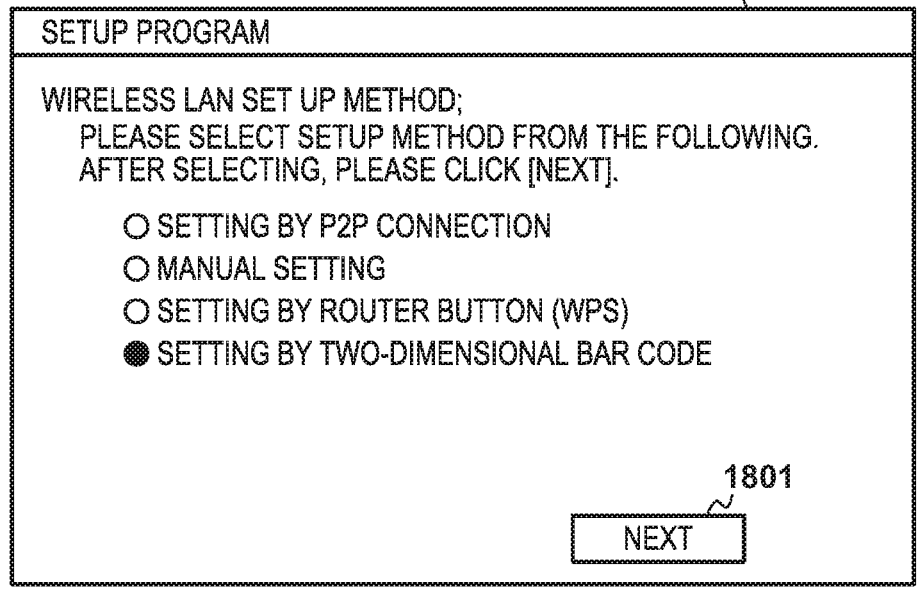
FIG. 18 is a view showing a screen for selecting a wireless LAN setup method, which is displayed by the PC to perform the wireless LAN setup of the printer according to the other embodiment.

In step S1101, the PC 101 searches for the printer 103 that stands by for the wireless LAN setup by direct wireless connection. The search is executed by searching for an SSID representing standby for the wireless LAN setup by direct wireless connection. This embodiment assumes that if the user instructs to execute the setup program, the PC 101 automatically searches for the printer 103 that stands by for the wireless LAN setup by direct wireless connection. However, the PC 101 that has executed the setup program may present a plurality of options to perform the wireless LAN setup of the printer 103 and prompt the user to select one of the options. A process in which the PC 101 prompts the user to select a wireless LAN setup method for the printer 103 will be described later with reference to FIG. 18.

Next, in step S1102, the PC 101 determines whether the printer 103 that stands by for the wireless LAN setup by direct wireless connection can be detected. If the PC 101 determines that the printer 103 can be detected, the PC 101 advances the process to step S1103, and executes the wireless LAN setup by direct wireless connection from the PC 101. Then, the PC 101 advances the process to step S1104, and searches for the printer 103 for which the wireless LAN setup by infrastructure connection is complete. The search is executed by transmitting/receiving a specific command between the PC 101 and the printer 103. The PC 101 advances the process to step S1106, and determines whether the printer 103 can be detected. If it is determined that the command is normally transmitted/received, the PC 101 determines that the setup of the printer 103 can normally be performed, and ends the process shown in FIG. 11; otherwise, the PC 101 determines that the wireless LAN setup by direct wireless connection fails, and advances the process to step S1107.

In step S1107, the PC 101 executes a process of displaying a two-dimensional bar code on the screen. Details of step S1107 executed by the PC 101 will be described with reference to a flowchart shown in FIG. 12.

Figure 12:
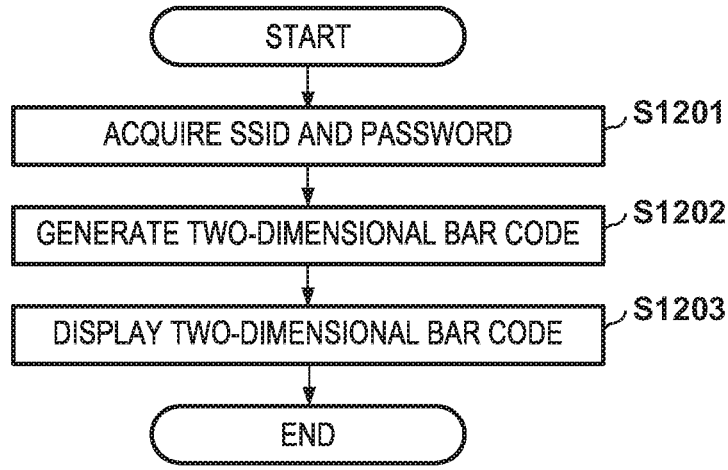
FIG. 12 is a flowchart illustrating an example of a process of displaying a two-dimensional bar code for the PC to perform the wireless LAN setup of the printer according to the other embodiment.
Figure 13:
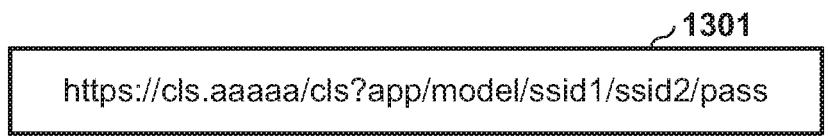
FIG. 13 is a view showing an example of a command necessary for the smartphone to perform the wireless LAN setup of the printer according to the other embodiment.

FIG. 12 is a flowchart illustrating the procedure of the process of displaying the two-dimensional bar code by the PC 101 that executes the setup program to perform the wireless LAN setup of the printer 103 according to the embodiment. In step S1201, the PC 101 loads the wireless profile 204 stored in the ROM 202 of the PC 101. Contents of the wireless profile 204 include information used for connection of an access point 225, and include, in one example, an SSID (Service Set IDentifier) and a passphrase. In step S1202, the PC 101 generates a character string by combining URL information for enabling the smartphone to load a program for making the printer 103 join the wireless LAN, SSID information necessary to perform wireless direct connection to the printer 103, the model name of the printer 103, and the SSID and passphrase of the access point 225, and converts the generated character string into a two-dimensional bar code. Assume that the URL information is stored in advance in the program. However, in one example, the PC 101 may acquire the URL information from the printer 103 or an external terminal on the Internet via the wired LAN I/F 210 or the wireless LAN I/F 206. FIG. 13 shows a command necessary for the smartphone 104 to perform the wireless LAN setup of the printer 103, which is an example of the generated character string. Note that ssid1 indicates the SSID of the printer 103 necessary for wireless direct connection to the printer 103 and ssid2 indicates the SSID of the access point 225.

Figure 14:
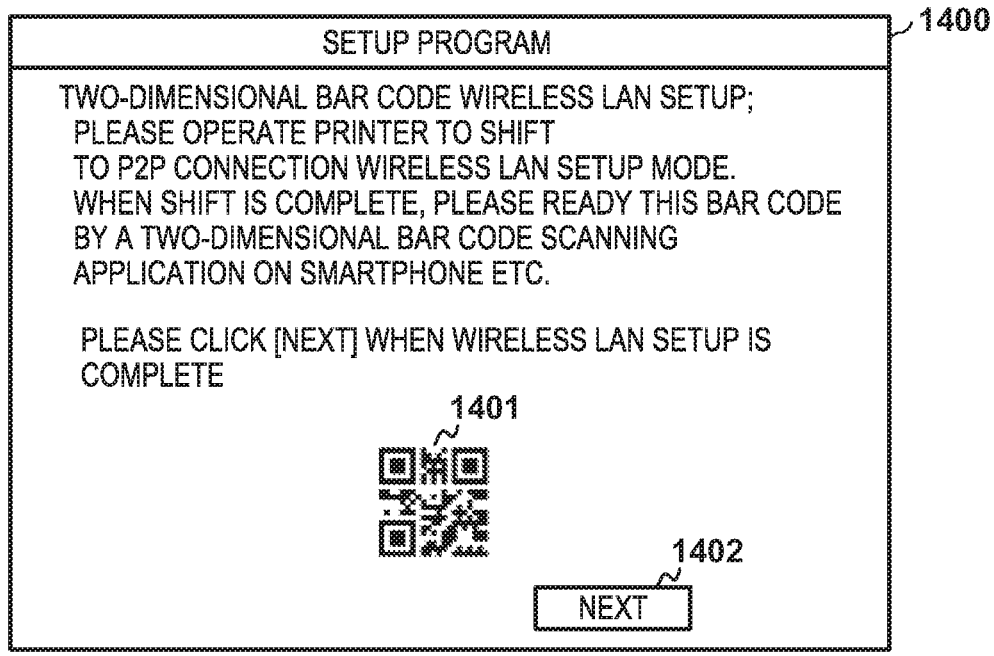
FIG. 14 is a view showing an example of a two-dimensional bar code screen displayed by the PC to perform the wireless LAN setup of the printer according to the other embodiment.
Figure 15:
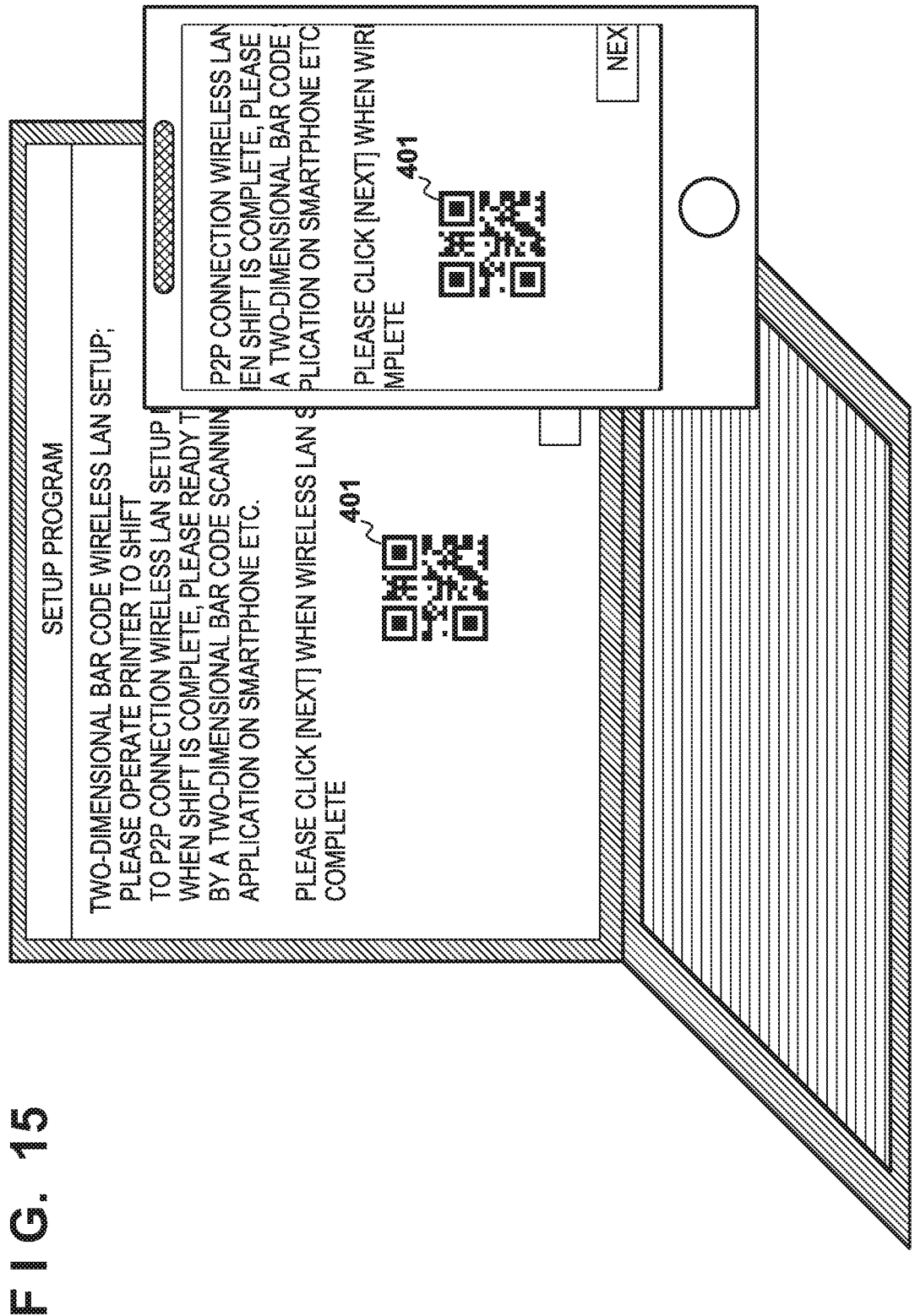
FIG. 15 is a view showing a state in which a two-dimensional bar code displayed in FIG. 14 is imaged by the smartphone.

Next, in step S1203, the PC 101 displays the generated two-dimensional bar code on the display apparatus 208 of the PC 101. FIG. 14 shows a two-dimensional bar code screen 1400 displayed by the PC 101 that executes the setup program. As will be described later with reference to step S1108, by imaging a two-dimensional bar code 1401 included in the two-dimensional bar code screen 1400 by the imaging apparatus 247 of the smartphone 104, as shown in FIG. 15, to scan the character string, the smartphone 104 can acquire the command shown in FIG. 13. If the user instructs to end the display of the two-dimensional bar code or a predetermined time elapses, the PC 101 ends the process shown in FIG. 12, and advances the process to step S1108 shown in FIG. 11.

In step S1108, the PC 101 executes the wireless LAN setup by direct wireless connection using the two-dimensional bar code and the smartphone. Details of step S1108 will be described with reference to a flowchart shown in FIG. 16.

Figure 16:
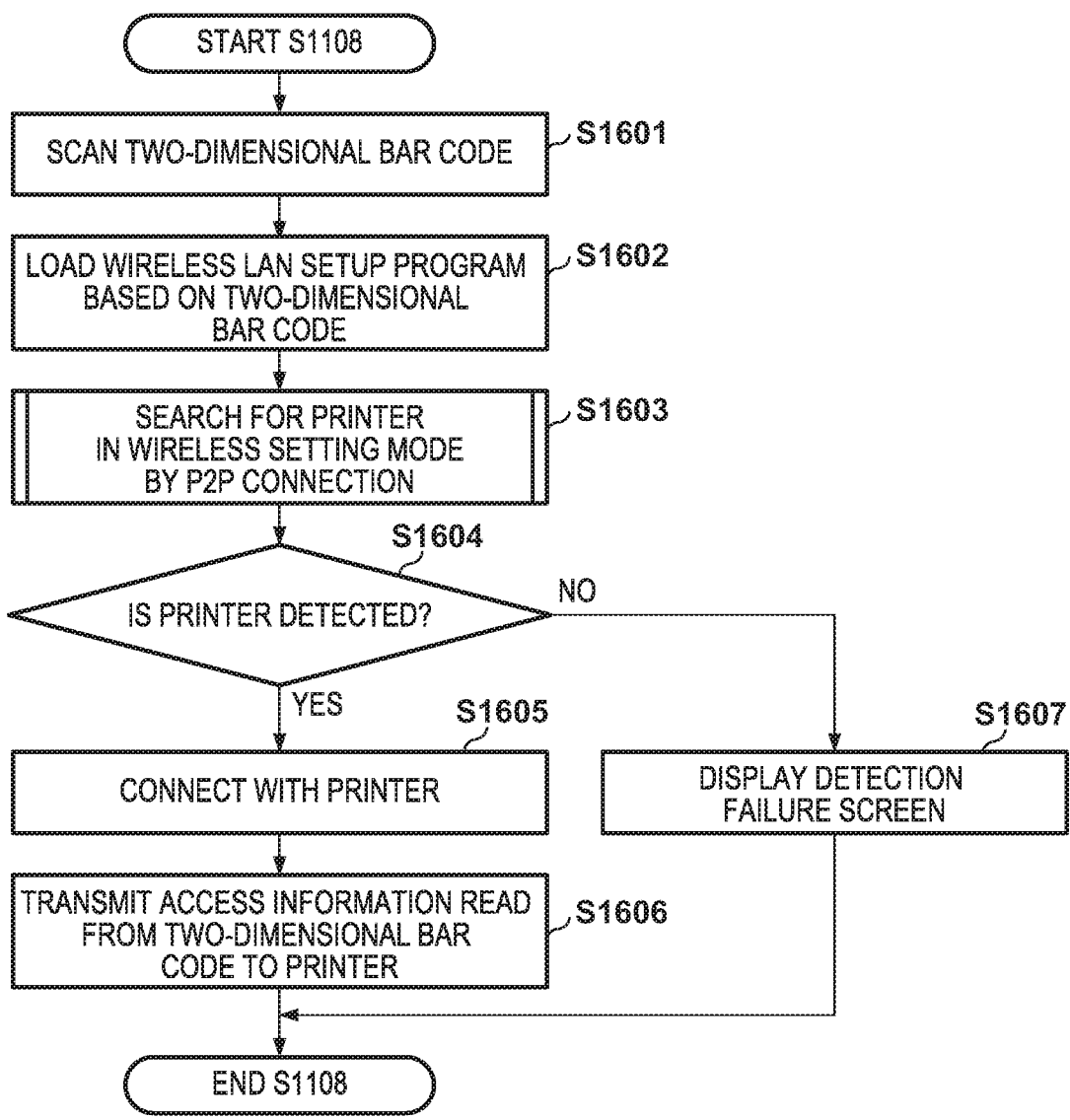
FIG. 16 is a flowchart illustrating an example of a two-dimensional bar code scan process of the smartphone according to the other embodiment.

FIG. 16 is a flowchart illustrating the procedure of the two-dimensional bar code scan process executed by the smartphone 104 according to the embodiment. The process shown in FIG. 16 is implemented when the CPU 241 of the smartphone 104 that has received the instruction to execute a two-dimensional bar code scan application from the user executes the program 243 stored in the ROM 242. First, in step S1601, the smartphone 104 uses the two-dimensional bar code scan application to scan the two-dimensional bar code displayed on the display apparatus 208 of the PC 101. The smartphone 104 advances the process to step S1602, analyzes the scanned two-dimensional bar code, and loads the wireless LAN setup program in accordance with an analysis result. As a result of the analysis, the smartphone 104 acquires a command 1301 converted into the two-dimensional bar code in step S1602. In this embodiment, the smartphone 104 acquires the information shown in FIG. 13. "https://cls.aaaaa/cls?app/model" of the first half of the command 1301, in FIG. 13, necessary for the wireless LAN setup is an example of information necessary to load the wireless LAN setup program. In step S1603, the smartphone 104 that executes the loaded wireless LAN setup program executes a search for the printer 103 in the wireless setting mode, which is necessary for wireless direct connection to the printer 103. The search for the printer 103 in the wireless setting mode is executed by searching for "ssid1" in the second half of the command 1301, in FIG. 13, necessary for the wireless LAN setup. The process of searching for the printer 103 in the wireless setting mode by the smartphone 104 has been explained with reference to FIG. 6 and a description thereof will be omitted. Next, the smartphone 104 advances the process to step S1604, and determines whether the printer 103 in the wireless setting mode is detected. If the printer 103 in the wireless setting mode is detected (YES in step S1604), the smartphone 104 advances the process to step S1605; otherwise (NO in step S1604), the smartphone 104 advances the process to step S1607, and displays a failure screen, thereby ending the process shown in FIG. 16. In step S1605, the smartphone 104 that executes the wireless LAN setup program performs wireless direct connection (P2P connection) to the printer 103, and transmits, to the printer 103, information that has been extracted from the command 1301, in FIG. 13, to be used to perform the wireless LAN setup and is necessary for the printer 103 to be connected to the access point 225. In one example, the smartphone 104 transmits the SSID (ssid2) and password (pass) of the access point 102 to the printer 103.

Next, the PC 101 advances the process to step S1109, and searches for the printer 103 for which the wireless LAN setup is complete. As described with reference to step S1105, the search is executed by transmitting/receiving a specific command between the PC 101 and the printer 103. The PC 101 advances the process to step S1110, and determines whether the printer 103 is detected. If it is determined that the command is normally transmitted/received, the PC 101 determines that the setup can normally be performed, and ends the process shown in FIG. 11; otherwise, the PC 101 determines that the wireless LAN setup by direct wireless connection from the PC 101 fails, and advances the process to step S1111.

In step S1111, the PC 101 executes another wireless LAN setup method. In this embodiment, "manual setting", "setting by button of router", or the like can be selected. If, for example, "manual setting" is selected, the user inputs the SSID and password of the access point 102 to perform connection to the access point 102 by operating the input I/F 239 of the printer 103. If "setting by button of router" is selected, the user presses a WPS button (not shown) of the access point 102 and the input I/F of the printer 103 to cause the printer 103 and the access point 102 to execute a WPS (Wi-Fi Protected Setup) process.

Next, the PC 101 advances the process to step S1112, and searches for the printer 103 for which the wireless LAN setup is complete. Similar to step S1105, the search is executed by transmitting/receiving a specific command between the PC 101 and the printer 103. The PC 101 advances the process to step S1113, and determines whether the printer 103 is detected. If, for example, it is determined that the specific command is normally transmitted/received in step S1112, the PC 101 determines that the printer 103 is detected. If the PC 101 determines that the printer 103 is detected (YES in step S1113), the process shown in FIG. 11 ends. If, for example, the specific command is not normally transmitted/received, and the PC 101 determines that the printer 103 cannot be detected (NO in step S1113), the PC 101 advances the process to step S1114, and notifies the user of the failure of the setup, thereby ending the process shown in FIG. 11.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-180719, filed Sep. 30, 2019 and Japanese Patent Application No. 2020-064198, filed Mar. 31, 2020 which are hereby incorporated by reference herein in their entirety.

What is claimed is:

1. A method for an information processing apparatus, comprising:

acquiring first information to be used to establish a connection to an access point and second information concerning a communication apparatus to be connected to the access point based on information acquired by imaging a first image displayed on a display unit of a second information processing apparatus different from the information processing apparatus;

acquiring third information, which is different from the first information, to be used to establish a connection to the access point from a storage unit of the information processing apparatus;

establishing a wireless connection to the communication apparatus based on the second information; and transmitting the first information and the third information to the communication apparatus to cause the communication apparatus to try connection to the access point, wherein the communication apparatus tries to connect to the access point based on the first information and the third information; and acquiring fourth information to be used to establish connection to the communication apparatus.

2. The method according to claim 1, wherein the first information includes an SSID of the access point.

3. The method according to claim 1, wherein the first image includes at least one of a bar code and a two-dimensional code.

4. The method according to claim 1, wherein the third first information includes authentication information to be used in an authentication process executed when performing connection to the access point.

5. The method according to claim 4, wherein the authentication information is a password.

6. The method according to claim 1, further comprising trying to establish connection to the access point based on the first information and the third information.

7. The method according to claim 6, further comprising:
acquiring fourth information to be used to establish connection to the communication apparatus; and
generating a second image including the first information and the third information, and displaying the second image on a display unit.

8. The method according to claim 7, wherein the second image includes at least one of a bar code and a two-dimensional code.

9. The method according to claim 7, wherein the fourth information includes an IP address of the communication apparatus.

10. The method according to claim 1, wherein the second information includes at least one of a model name and a serial number of the communication apparatus.

11. The method according to claim 1, wherein the third information is stored in the storage unit by the information processing apparatus connecting to the access point.

12. An information processing apparatus comprising:
at least one processor; and
at least one memory storing instructions that, upon execution by the at least one processor, cause the at least one processor to function as:
an acquisition unit configured to acquire first information to be used to establish a connection to an access point and second information concerning a communication apparatus to be connected to the access point based on information acquired by imaging a first image displayed on a display unit of a second information processing apparatus different from the information processing apparatus;

an acquiring unit configured to acquire third information, which is different from the first information, to be used to establish a connection to the access point from a storage unit of the information processing apparatus;

a first connection unit configured to establish wireless connection to the communication apparatus based on the second information; and a transmission unit configured to transmit the first information and the third information to the communication apparatus to cause the communication apparatus to try connection to the access point, wherein the communication apparatus tries to connect to the access point based on the first information and the third information; and acquiring fourth information to be used to establish connection to the communication apparatus.

13. The apparatus according to claim 12, wherein the first information includes an SSID of the access point.

14. A method for a communication system including a communication apparatus and an information processing apparatus, comprising:
acquiring, by the information processing apparatus, first information to be used to establish a connection to an access point and second information concerning a communication apparatus to be connected to the access point based on information acquired by imaging a first image displayed on a display unit of a second information processing apparatus different from the information processing apparatus;

acquiring third information, which is different from the first information, to be used to establish a connection to the access point from a storage unit of the information processing apparatus;

establishing, by the information processing apparatus, wireless connection to the communication apparatus based on the second information;

transmitting, by the information processing apparatus, the first information and the third information to the communication apparatus;

receiving, by the communication apparatus, the first information and the third information from the information processing apparatus; and trying, by the communication apparatus, to establish connection to the access point using the first information and the third information received in the receiving; and acquiring, fourth information to be used to establish connection to the communication apparatus.

15. The apparatus according to claim 12, wherein the first image includes at least one of a bar code and a two-dimensional code.

16. The apparatus according to claim 12, wherein the third information includes authentication information to be used in an authentication process executed when performing connection to the access point.

17. The apparatus according to claim 16, wherein the authentication information is a password.

18. The apparatus according to claim 12, further comprising trying to establish connection to the access point based on the first information and the third information.

19. The apparatus according to claim 12, wherein the second information includes at least one of a model name and a serial number of the communication apparatus.

20. The apparatus according to claim 12, wherein the third information is stored in the storage unit by the information processing apparatus connecting to the access point.

\* \* \* \* \*